United States Patent
Farhi et al.

(10) Patent No.: US 11,940,984 B2
(45) Date of Patent: Mar. 26, 2024

(54) AUDIT RECORDS MONITORING USING A BLOCKCHAIN STRUCTURE

(71) Applicant: DocuSign, Inc., San Francisco, CA (US)

(72) Inventors: Ezer Farhi, Givatavim (IL); Peleg Atar, Nes Tziona (IL); Nataly Beigel, Modiin (IL); Gal Silverstein, Tel Aviv-Jaffa (IL); Michael Mualem, Petah Tikva (IL); Danielle Filin Horovitz, Hashason (IL); Alona Raz, Petach Tikva (IL)

(73) Assignee: DOCUSIGN, INC., San Francisco, CA (US)

( * ) Notice: Subject to any disclaimer, the term of this patent is extended or adjusted under 35 U.S.C. 154(b) by 0 days.

(21) Appl. No.: 17/549,578

(22) Filed: Dec. 13, 2021

(65) Prior Publication Data

US 2023/0185793 A1 Jun. 15, 2023

(51) Int. Cl.
| | |
|---|---|
| *G06F 7/00* | (2006.01) |
| *G06F 16/23* | (2019.01) |
| *G06F 16/27* | (2019.01) |
| *G06F 17/00* | (2019.01) |
| *H04L 9/32* | (2006.01) |
| *H04L 9/00* | (2022.01) |

(52) U.S. Cl.
CPC .......... *G06F 16/2365* (2019.01); *G06F 16/27* (2019.01); *H04L 9/3247* (2013.01); *H04L 9/50* (2022.05)

(58) Field of Classification Search
CPC .... G06F 16/2365; G06F 16/27; G06F 16/273; G06F 16/275; G06F 16/278; H04L 9/3247; H04L 9/50
See application file for complete search history.

(56) References Cited

U.S. PATENT DOCUMENTS

| | | | |
|---|---|---|---|
| 2017/0109735 A1* | 4/2017 | Sheng | G06Q 20/3678 |
| 2020/0334379 A1* | 10/2020 | DeRosa-Grund | G06F 21/645 |
| 2022/0245122 A1 | 8/2022 | Ashlock et al. | |
| 2022/0245201 A1 | 8/2022 | Ashlock et al. | |
| 2022/0245592 A1 | 8/2022 | Ashlock et al. | |
| 2023/0185940 A1 | 6/2023 | Farhi et al. | |

* cited by examiner

*Primary Examiner* — Tuan A Pham
(74) *Attorney, Agent, or Firm* — Shumaker & Sieffert, P.A.

(57) ABSTRACT

A centralized auditing system receives an audit block containing one or more audit files generated by an audit agent running in an audited device. The audit block additionally stores a first digital signature corresponding to a previous audit block, and a second digital signature generated based at least on the one or more audit files and the first digital signature. After receiving the audit block, the auditing system verifies the integrity of the received audit block based on the second digital signature stored in the audit block and/or the first digital signature corresponding to the previous audit block. In response to verifying the integrity of the received audit block, the auditing system adds the received audit block to an audit register. Moreover, the auditing system adds the one or more audit files included in the audit block to an audit database.

18 Claims, 7 Drawing Sheets

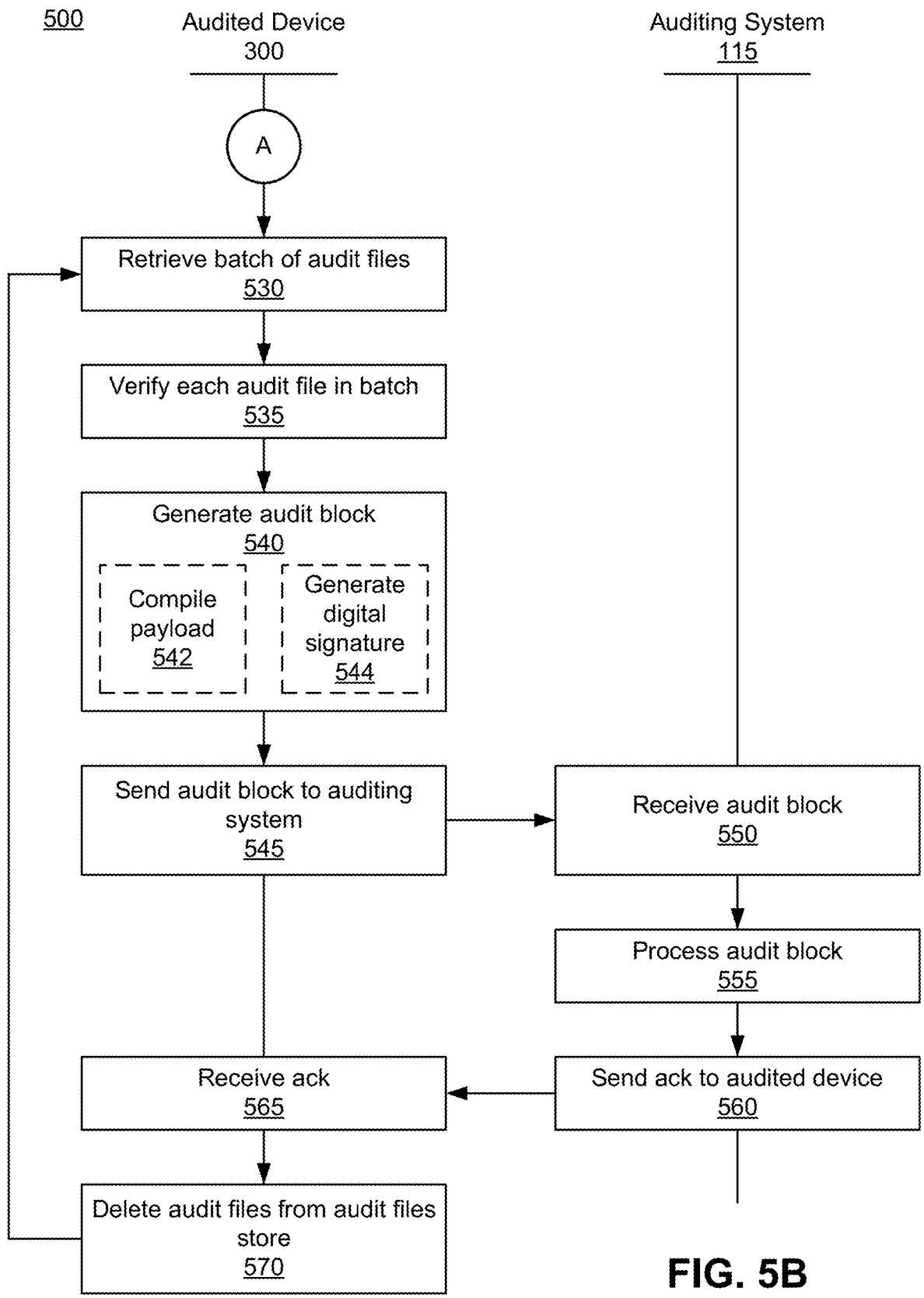

AUDIT RECORDS MONITORING USING A BLOCKCHAIN STRUCTURE

BACKGROUND

This disclosure relates generally to computer security and computer auditing, and more specifically to processing of audit records storing information related to the operation of a computing system.

Entities may store audit records including information about the operation of one or more computing systems or information technology infrastructure to be able to later analyze whether the computing system or information technology infrastructure behaved in an expected manner. For example, audit records may be used to determine whether an authorized access to a computing system has occurred and to identify how the unauthorized access to the computing system occurred if one is detected. Processing of the audit records by an audited computing system can add a significant load to the computing system itself. For example, each time an audited device reports an event to a remote auditing system, the auditing device secures the message containing information about the reported event (such as by generating a digital signature to authenticate the message or by encrypting the message to prevent unauthorized access to the message), Additionally, to ensure proper communication of the messages containing information about the reported events, some data overhead is added each time a new event is reported by the auditing device. For instance, after a message reporting a new event is sent to the auditing system, the auditing device waits for an acknowledgment of the message by the auditing system verifying that the auditing system has received the message and that the message was processed correctly. This data overhead can lead to communication bandwidth being wasted, as well as additional workload to both the auditing device and the auditing system. Moreover, when there is an unauthorized access to a computing system, the audit records for the computing system may also be the target of an attack. For instance, an entity accessing the computing system may try to delete or modify the audit records to prevent the detection of the unauthorized access.

SUMMARY

The processing of audit records or audit files for auditing a computing system is described herein. To reduce the computational power for verifying the integrity and authenticity of the audit files, and to reduce the amount of data used for transferring the audit files from an audited device to an auditing system, the audit files are batched. Periodically or upon the occurrence of a predetermined event, an audit agent running on an audited device retrieves a set of audit files and bundles the audit files in an audit block. To verify the authenticity and integrity of the audit files included in the audit block, the audit agent generates a digital signature for the audit block based at least in part on information corresponding to each of the audit files included in the audit block.

By batching the audit files into an audit block and generating a single digital signature for the audit block, the computational power used for verifying the integrity and authenticity of every audit file is decreased. Instead of generating a digital signature for each individual audit file, the digital signature for the audit block allows the auditing system to determine the validity of every audit file included in the audit block simultaneously. Moreover, by batching the audit files into an audit block, the amount of overhead for sending the audit files from the audited device to the auditing system is also reduced. For example, by batching the audit files into an audit batch, the auditing system can acknowledge the reception and successful processing of every audit file included in the audit block using a single message.

In one embodiment, an audited device generates, for each of a plurality of events, an audit file and the audit device may locally store the audit files. Upon the occurrence of a trigger condition, the audit device retrieves a batch of audit files stored locally and generates an audit block for transmitting the batch of audit files to an auditing system. The audit block includes the audit files in the batch of audit files, and a digital signature generated based in part on the audit files in the batch of audit files. The audited device then sends the audit block to the auditing system. Accordingly, the amount of data for transmitting the audit files from the audited device to the auditing system may be reduced. Additionally, the computational power for authenticating the audit files to the auditing system may also be reduced.

In some embodiments, the audited system additionally generates a message authentication code (MAC) for each audit file and stores the MACs and an association between each MAC and a corresponding audit file. By using the MAC, the audited device can verify the integrity of the stored audit files when batching the audit files to generate an audit block.

In some embodiments, the audited device receives an acknowledgment from the auditing system. For example, the audited device may receive the acknowledgment after the auditing system receives an audit block, or after the auditing system finishes processing an audit block. Moreover, upon receiving the acknowledgment from the auditing system, the audited device may delete the audit files that were included in the audit block associated with the acknowledgment.

In some embodiments, each audit file includes a message describing the event associated with the audit file, an indication of a type of the event associated with the audit file, a timestamp for the event associated with the audit file, an indication of whether the event was successful, an identification of an application reporting the event associated with the audit file, an identification of a service the application reporting the event associated with the audit file is a part of, and an identification of a user associated with the event associated with the audit file.

Additionally, in some embodiments, the audited device is a document system configured to generate a document package in response to receiving a request from an originating entity. In this embodiment, the audited device may generate a new audit file whenever a new document package is created, whenever a document package is modified, or whenever a document of a document package is executed. Moreover, in this embodiment, each audit file may additionally include an identification of a document package associated with the event associated with the audit file, and an identification of an account associated with the event associated with the audit file.

Furthermore, to increase the security of audit files stored in the auditing system, an audit register is employed. In some embodiments, the audit register is a blockchain having a set of blocks linked using digital signatures. Specifically, a digital signature corresponding to a previous audit block is included in each audit block sent to the auditing system. The digital signature corresponding to the previous block links or chains an audit block with a previous audit block preceding the audit block, forming a blockchain of audit blocks. In some embodiments, the blockchain is a centralized blockchain. By using the audit register, the auditing system is able to identify if audit records stored by the auditing system have been tampered with. For example, by using an audit register, the deletion of audit records can be detected by the auditing system by identifying missing blocks in the audit register.

In one embodiment, a centralized auditing system receives an audit block storing one or more audit files generated by an audit agent running in an audited device. The audit block additionally stores a first digital signature corresponding to a previous audit block, and a second digital signature generated based at least on the one or more audit files and the first digital signature. After receiving the audit block, the auditing system verifies the integrity of the received audit block based on the first digital signature stored in the audit block and/or the second digital signature corresponding to the previous audit block stored in the audit block. In response to verifying the integrity of the received audit block, the auditing system adds the received audit block to an audit register. Moreover, the auditing system adds the one or more audit files included in the audit block to an audit database.

In some embodiments, to verify the integrity of a received audit block the auditing system retrieves a public key associated with the audited device and verifies the second digital signature stored in the audit block using the public key. Moreover, to verity the integrity of the received audit block, the auditing system identifies the previous audit block in the audit register, retrieves the second digital signature stored in the identified previous audit block, and compares the first digital signature stored in the received audit block with the retrieved first digital signature stored in the identified previous audit block.

In some embodiments, to add the one or more audit files included in the audit block to the audit database, the auditing system, for each audit file included in the audit block, generates one or more audit records based on information included in the audit file, and stores the generated audit records in the audit database.

In some embodiment, the auditing system periodically (or upon the occurrence of a triggering condition) verifies the integrity of the audit register. In some embodiments, to verify the integrity of the audit register, the auditing system, for each audit block of the audit register, verifies the second digital signature of the audit block, and comparing the first digital signature stored in the audit block with the second digital signature stored in the previous audit block. Alternatively, or in addition, to verifying the integrity of the audit register, the auditing system, for each audit file stored in each audit block of the audit register, identifies an audit record stored in the audit database and compares the information stored in the identified audit record with information stored in the audit file.

BRIEF DESCRIPTION OF THE DRAWINGS

FIGS. 5A and 5B are a flowchart of a process for generating an audit block for sending a batch of audit files from an audited device to an auditing system 115, according to one or more embodiments.

Figure 1:
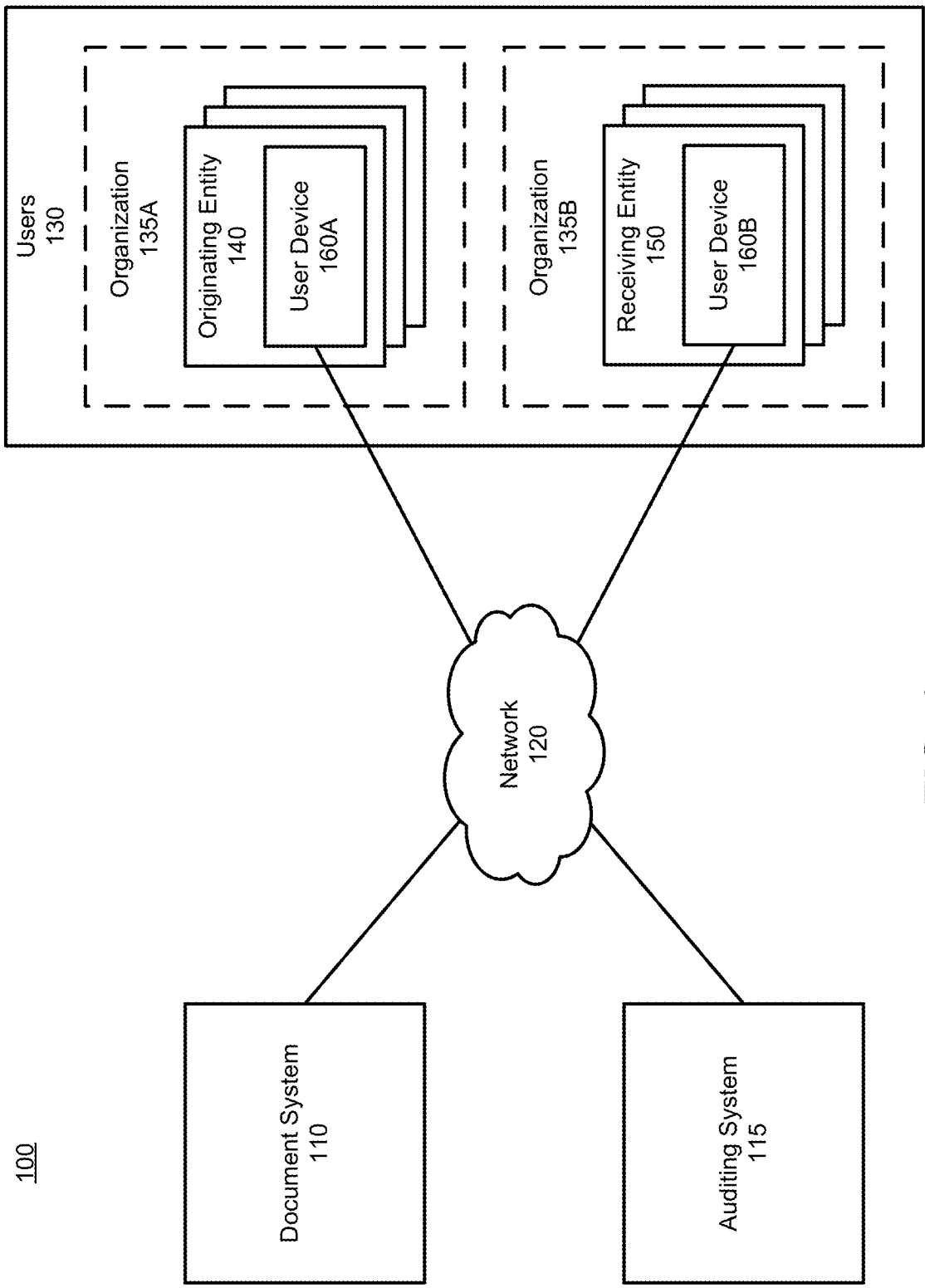
FIG. 1 is a block diagram of a system environment in which a document system operates, according to one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

A system environment enables an originating entity of a first organization to create and send documents to one or more receiving entities of a second organization for negotiation, collaborative editing, electronic execution (e.g., electronic signature), automation of contract fulfilment, archival, and analysis, among other tasks. Within the system environment, a receiving entity may review content and/or terms presented in a digital document, and in response to agreeing to the content and/or terms, can electronically execute the document. In some embodiments, in advance of the execution of the documents, the originating entity may generate a document package to provide to the one or more receiving entities. The document package includes at least one document to be executed by one or more receiving entities. In some embodiments, the document package may also include one or more permissions defining actions the one or more receiving entities can perform in association with the document package. In some embodiments, the document package may also identify tasks the one or more receiving entities are to perform in association with the document package.

The system environment described herein can be implemented within a document system, an online document system, a document management system, or any type of digital management platform. It should be noted that although description may be limited in certain contexts to a particular environment, this is for the purposes of simplicity only, and in practice the principles described herein can apply more broadly to the context of any digital management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform. It should also be noted that "document system," "document management system," and other similar terminology are used interchangeably herein.

The processes described herein, in some implementations, provide a means for the one or more receiving entities to assign a set of permissions to additional receiving entities. The document system automatically assigns the set of permissions to the additional receiving entities if the set of permissions are included in the one or more permissions originally assigned to receiving entities within the document package by the originating entity. The document system requests that the originating entity confirm that the additional receiving entities can be assigned the set of permissions before assigning if the set of permissions are not included in the one or more permissions originally assigned to the receiving entities by the originating entity.

The processes described herein, in alternative implementations, provide a means for the document package to be modified prior to the document package being provided to the one or more receiving entities. The document system scans the document package to determine whether the document package includes at least one document of a particular document type (e.g., purchase agreement, sales contract, etc.) specified in a policy of a second organization (the organization associated with the one or more receiving entities). The policy may specify for particular document types certain acting entities within the second organization and certain tasks the acting entities are to perform in relation to the document package before the documents can be executed. If the document package contains at least one document of a particular document type specified by the policy, the document system automatically modifies the document package to identify the certain acting entities and the tasks the acting entities are to perform corresponding to the document type without requesting permission from the originating entity. The document package is then provided to the second organization for execution. It should also be noted that "acting entity," "receiving entity," and other similar terminology are used interchangeably herein.

The processes described herein, in additional implementations, provide a means for the document package to be modified to be sent an additional receiving entity if a receiving entity is unavailable. The document system receives an indication that a receiving entity is unavailable and a substitute receiving entity is identified based on one or more rules of the second organization. The document package is modified and provided to the substitute entity for execution. Additional functionalities of example document systems may be found in U.S. patent application Ser. Nos. 17/162,722, 17/162,744, and 17/162,765 filed Jan. 29, 2021, which are incorporated herein by reference.

FIG. 1 is a block diagram of a system environment in which an auditing system operates, according to one or more embodiments. The system environment 100 shown by FIG. 1 comprises a document system 110, an auditing system 115, a network 120, a plurality of users 130 which includes a subset of originating entities 140 associated with a first organization 135A and a subset of receiving entities 150 associated with a second organization 135B, each associated with a user device 160 (e.g., originating entity 140 is associated with user device 160A and receiving entity 150 is associated with user device 160B). In alternative configurations, different and/or additional components may be included in the system environment 100.

The document system 110 is a computer system (or group of computer systems) for storing and managing documents and/or document packages (e.g., envelopes) for a plurality of users 130. Using the document system 110, users 130 can collaborate to create, edit, review, negotiate, and execute documents. During execution of one or more documents, the document system 110 provides a means for generating and modifying a document package (also referred to as a document envelope). The document package may include at least one document for execution. The document system 110 may provide the at least one document (e.g., a contract, agreement, purchase order, or other suitable document) in which terms have been agreed upon by two or more organizations (e.g., by two or more users 130, such as organization 135A and organization 135B) to a receiving entity 150 of organization 135B for execution, as described above. The document system 110 may generate the document package per a request from an originating entity 140 of organization 135A. In some implementations, the document package may additionally include a set of document permissions. The document system 110 may provide a means for the receiving entity 150 of organization 135B to request to assign the set of document permissions to a second receiving entity of organization 135B. In other implementation, the document system 110 may scan the document package (including the document) to determine whether the document package includes a document of a particular type (e.g., identified by a policy of organization 135B), and if so, may provide the document package to additional receiving entities 150 of organization 135B not originally specified to receive the document package. In other implementations, the document system 110 modifies the document package to be sent to a substitute receiving entity 150 based on the original receiving entity 150 being unavailable.

The document system 110 can be a server, server group or cluster (including remote servers), or another suitable computing device or system of devices. In some implementations, the document system 110 can communicate with user devices 160 over the network 120 to receive instructions and send document packages (or other information) for viewing on user devices 160. The document system 110 will be discussed in further detail with respect to FIG. 2.

The auditing system 115 is a computer system (or group of computer systems) for storing and managing audit records and/or audit files for auditing the operation of a computing device or system (such as the document system 110). The computing device or system reports, to the auditing system 115, audit file corresponding to events that are being tracked by the computing device. The auditing system 115 processes and stores the audit files. The audit files can, for example, be used for detecting an unauthorized access to the computing device, or tampering with information stored by the computing device. The auditing system 115 may analyze the audit file to detect anomalies in the audit files, and may send notifications to a system administrator if an anomaly is detected in the audit files.

The auditing system 115 can be a server, server group or cluster (including remote servers), or another suitable computing device or system of devices. In some implementations, the auditing system 115 can communicate with the document system 115 over the network to receive audit records (or other information) for processing. Moreover, the auditing system 115 can communicate with user devices 160 over the network 120 to receive instructions and send audit information (or other information) for viewing on user devices 160. In some embodiments, the auditing system 115 and the document system 110 are combined into a single system. The auditing system 115 will be discussed in further detail with respect to FIG. 3B.

The network 120 transmits data within the system environment 100. The network 120 may comprise any combination of local area and/or wide area networks, using both wired and/or wireless communication systems, such as the Internet. In some embodiments, the network 120 transmits data over a single connection (e.g., a data component of a cellular signal, or Wi-Fi, among others), and/or over multiple connections. In some embodiments, the network 120 uses standard communications technologies and/or protocols. For example, the network 120 includes communication links using technologies such as Ethernet, 802.11, 3G, 4G, code division multiple access (CDMA), digital subscriber line (DSL), and the like. Data exchanged over the network 120 may be represented using any suitable format, such as hypertext markup language (HTML) or extensible markup language (XML). In some embodiments, the network 120 may include encryption capabilities to ensure the security of customer data. For example, encryption technologies may include secure sockets layers (SSL), transport layer security (TLS), virtual private networks (VPNs), and Internet Protocol security (IPsec), among others.

Through the network 120, the document system 110 and the auditing system 115 can communicate with user devices 160 associated with the users 130. A user 130 can represent an individual, group, or other entity that is able to interact with document packages (or other content) generated on and/or managed by the document system 110. Each user 130 can be associated with a username, email address, or other identifier that can be used by the document system 110 to identify the user 130 and to control the ability of the user 130 to view, modify, and otherwise interact with document packages managed by the document system 110. In some implementations, users 130 can interact with the document system 110 through a user account with the document system 110 and one or more user devices 160 accessible to that user 130. In the embodiment of FIG. 1, the plurality of users 130 are split into users associated with organization 135A and users associated with the organization 135B.

As described above, an organization is a business, group, individual, or the like that is associated with a set of users 130 and one or more document packages in the document system 110. For example, a document package may originate at organization 135A and be sent to organization 135B for viewing, editing, and execution. In a specific implementation, the document package may be created by originating entity 140 and be sent via the document system 110 to a receiving entity 150 during the execution of the one or more documents included within the document package.

In the embodiment of FIG. 1, an originating entity 140 from the organization 135A creates the document package via the document system 110. In this example, the organization 135A includes a set of originating entities 140 which, as used herein, are users 130 who have a user account with the document system 110. The organization 135B includes a set of receiving entities 150 which, as used herein, are users 130 who have a user account with the document system 110. The document package is sent by the document system 110 for review and execution by a receiving entity 150 of the organization 135B.

Each user device 160 is a computing device capable of receiving user input (for example from a user 130) as well as transmitting and/or receiving data to the document system 110 via the network 120. For example, a user device 160 can be a desktop or a laptop computer, a smartphone, tablet, or another suitable device. User devices 160 are configured to communicate via the network 120 (for example, with the document system 110). In one embodiment, a user device 160 executes an application allowing a user 130 of the user device 160 to interact with the document system 110. For example, a user device 160 can execute a browser application to enable interaction between the user device 160 and the document system 110 via the network 120. In some embodiments, a single user 130 can be associated with multiple user devices 160, and/or one user device 160 can be shared between multiple users 130 who may, for example, log into a personal account on the user device 160 to access the document system 110.

Example Document System Architecture

Figure 2:
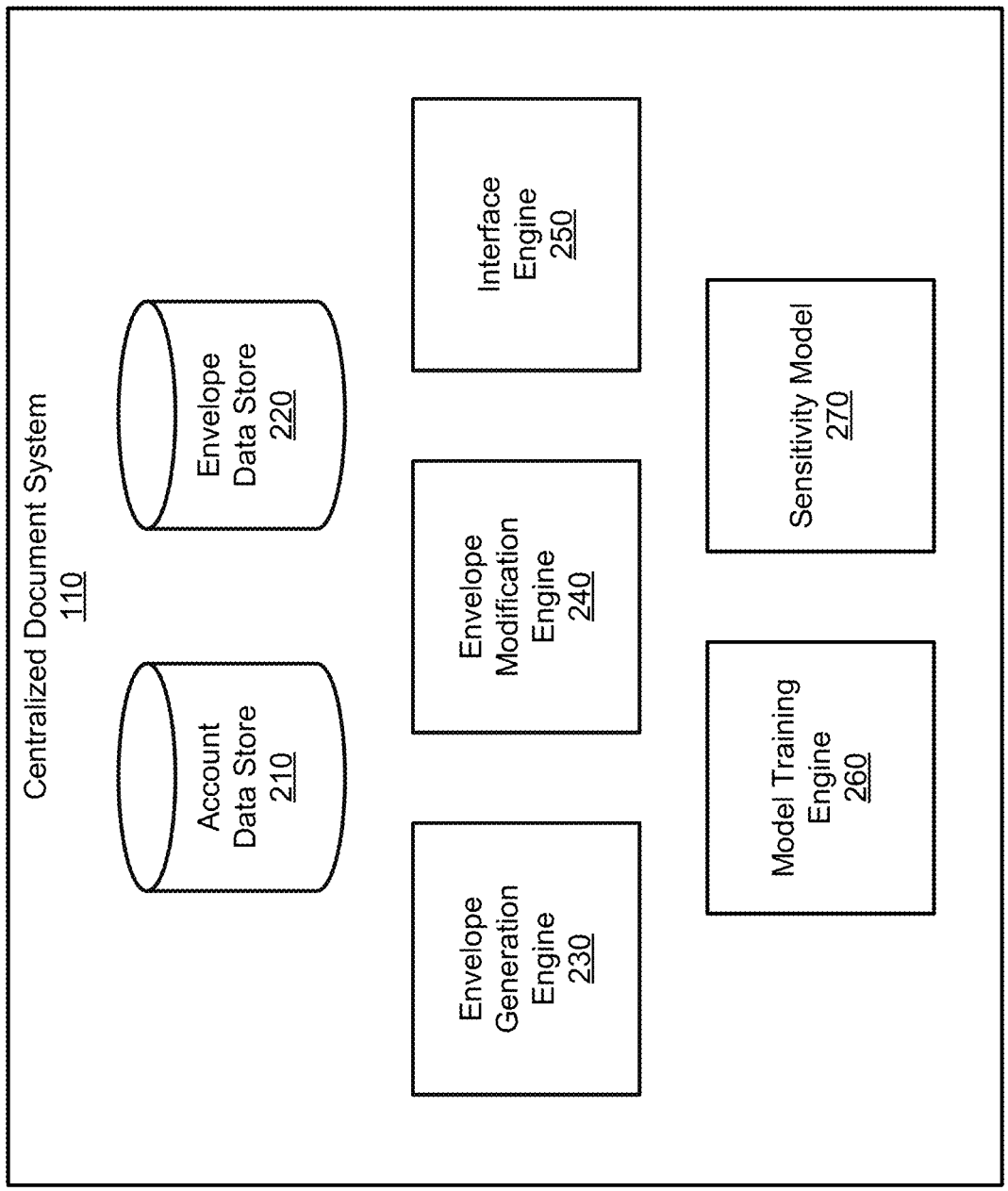
FIG. 2 is a block diagram of a document system, according to one or more embodiments.

FIG. 2 is a block diagram of a document system 110, according to one or more embodiments. Components of the document system 110 may be a combination of hardware and software. The document system 110 may include an account data store 210, an envelope data store 220, an envelope generation engine 230, an envelope modification engine 240, an interface engine 250, a model training engine 260, and a sensitivity model 270. In various embodiments, the document system 110 may include fewer or additional components that are not shown in FIG. 2. For example, conventional components such as network interfaces, security functions, load balancers, failover servers, management and network operations consoles, and the like are not shown so as to not obscure the details of the system architecture. The functions of the document system 110 may be distributed among the components in a different manner than described.

The account data store 210 is a file storage system, database, set of databases, or other data storage system storing information associated with accounts of the document system 110. The organizations 135A and 135B may be associated with one or more accounts with the document system 110. In some embodiments, an organization may be associated with a parent account and each entity within the organization may be associated with a user account. For example, the organization 135B has a parent account and each receiving entity 150 within the organization 135B has a user account with the document system 110. The parent account may be associated with a policy of an organization and/or an org chart for the organization. A policy of the organization is a system of principles that guide certain processes or workflows for the organization. For example, a policy of organization 135B may dictate which receiving entities 150 within the organization 135B are to receive document packages and a set of tasks the receiving entities 150 are to perform in relation to the document package or a set of permissions the receiving entities 150 may be subject to in relation to the document package. In some embodiments, the policy specifies acting entities and corresponding sets of tasks for the acting entities to perform in relation to the document package based on document types and/or types of document content of the one or more documents included in the document package. In some embodiments, the policy specifies one or more thresholds corresponding to one or more types of document content (e.g., a payment amount, a payment term, etc.). For example, a policy may specify a threshold payment amount and corresponding acting entities and sets of tasks for the acting entities to perform if a payment amount within a document package exceeds the threshold payment amount. The org chart may include a list of entities (e.g., including names, titles, roles, departments, direct reports, supervisors, teams, groups, etc.) within the organization.

A policy of an organization may specify conditions under which a receiving entity can delegate a substitute receiving entity for executing documents. Conditions can indicate that the receiving entity is unavailable to execute the document. Example conditions include the presence of an automated reply message (e.g., an out-of-office message for an email service) or the current date falling within a vacation schedule as recorded with the organization (e.g., recorded on a software managed by a human resources department or a supervisor and accessible to the document system 110). In one example, a policy specifies that if a receiving entity of an organization has an out-of-office message enabled for incoming emails, then document packages created by the originating entity and intended for the receiving entity may also be provided to substitute entities that the receiving entity has assigned appropriate permissions to act on their behalf. Conditions can additionally or alternatively indicate an urgency at which the document must be executed. For example, a document package may be sent with a flag indicating that urgent attention should be provided to the document package. The document system 110 may determine the flag is present based on metadata of the document package indicating the content is urgent or perform object recognition on the documents with the package to determine words or images indicating urgency are present (e.g., words like "urgent" or "immediate" or images of an attention or warning sign).

Furthermore, an organization's policy may specify override conditions under which, despite the conditions being met for a substitute receiving entity to be delegated document packages intended for a receiving entity, the substitute receiving entity is prevented from receiving the document packages. The override conditions may indicate that the substitute receiving entity is not authorized to receive a document package or document having a particular sensitivity level. Sensitivity levels are described further below. The document system 110 may determine not to delegate a document to a substitute receiving entity in response to determining that an override condition is met. In one example, an override condition indicates that the substitute receiving entity is not authorized to receive a document having a second sensitivity level. In this example, a condition for delegating a substitute entity may specify that the substitute receiving entity is authorized to receive a document having a first sensitivity level. After determining that the override condition is met, the document system 110 prevents the document from being provided to the substitute receiving entity. The document system 110 may still provide the document to the intended receiving entity.

A sensitivity level may be a metric for quantifying the sensitivity of a document. Sensitivity levels may correspond to amounts of sensitive content within a document, varieties of sensitive content, sensitivities of content within a document, or a combination thereof. Sensitive content may include personal identifiable information (PII), classified information (e.g., a business proposal or a trade secret), compensation values (e.g., a salary), medical information, or any suitable type of information that is not readily available to the public. An amount of sensitive content may be determined by the number of occurrences of sensitive information within a document (e.g., the number of times confidential medical information is mentioned in the document). A variety of sensitive content may be determined by the number of different types of sensitive information (e.g., as listed above with reference to the different types of sensitive content). A sensitivity of content may be determined according to a pre-defined or automatically determined categorization of sensitive content into groups with different criticalities of sensitivity. For example, a classified proposal for a government agency may be more sensitive than the birthday of an employee of an organization. The document system 110 may receive pre-defined categories for sensitivity levels from a user (e.g., of the organization of the originating entity) or determine groups automatically based on a history of which documents were and were not delegated and corresponding document and entity attributes. For example, the document system 110 may determine a first sensitivity level using a clustering algorithm that clustered classified documents having document attributes like the same document type and the same author and sent to a receiving entity having similar entity attributes (e.g., the IP address of the receiving entity) into the same cluster.

Each user account associated with an entity may include information about the entity, such as information about the individual with access to the user account, age of the account, frequency of account use, log of past account transactions, and the like. Information about the individual with access to the account may include the individual's name, email address, computing device(s) used to access the account, an Internet Protocol (IP) address used to access the account, title, role, or department in an organization, and the like. The individual's title is a title indicating their authority such as a position title or job title held by the individual with the organization. The individual's role is a function that the individual fulfills within their organization. For example, a title may be "General Counsel" and a role may be reviewing and executing agreements. The individual's department is a group within the organization where the individual works. For example, a department may be operations, finance, sales, human resources, purchases, legal, and the like. The term "entity attributes" may refer to information about the entity as described above.

The envelope data store 220 is a file storage system, database, set of databases, or other data storage system storing information associated with document envelopes. The organizations 135A and 135B provide one or more documents for execution to other organizations via envelopes. A document envelope (also referred to as a document package) can include at least one document for execution. The at least one document may have been previously negotiated by the organizations 135A and 135B. And, as such, the document may be ready for execution upon the creation of an envelope. The document package may also include recipient information and document fields indicating which fields of the document need to be completed for execution (e.g., where a receiving entity 150 should sign, date, or initial the document). The recipient information may include contact information for a receiving entity 150 (e.g., a name and email address). A document may be characterized by one or more document attributes such as an author of the document, a document type (e.g., a bank form or rental agreement), content of the at least one document (e.g., image or text), and a date at which the document was generated.

In some embodiments, the document package may also include a set of permissions. The set of permissions may be assigned by an originating entity 140. The set of permissions included in the document package define one or more actions that a receiving entity 150 can perform with regard to the document package. The one or more actions may include adding one or more additional receiving entities 150 to the document package, removing one or more receiving entities 150 from the document package, updating an order in which two or more receiving entities 150 receive the document package, updating one or more tasks of one or more receiving entities 150 of the document package, adding one or more additional documents to the document package, removing one or more documents from the document package, providing a notification (e.g., "Documents within document package need careful review") to one or more receiving entities 150 about the document package, and the like. For example, an originating entity 140 may set the following permissions for a document package: allow receiving entity 150 to add additional receiving entities 150, allow receiving entity 150 to remove one or more documents from the document package, allow receiving entity 150 to execute one or more documents, allow receiving entity 150 to modify one or more documents, and the like.

In some embodiments, the document package may also identify a first set of acting entities (e.g., the receiving entities 150 of organization 135B specified by the originating entity 140 that are to be provided with the document package), and for each acting entity, the document package may also identify a first set of tasks that the acting entity is to perform with regard to the document package. The first set of tasks may define what each acting entity is to do and complete before the at least one document of the document package can be executed. The set of tasks may include reviewing the at least one document, initialing the at least one document, signing the at least one document, providing information for the at least one document, and the like.

The envelope generation engine 230 may generate envelopes for a user 130 to send to a different user 130. For example, the envelope generation engine 230 may generate an envelope for organization 135A to send to organization 135B. In a specific implementation, the envelope generation engine 230 may receive instructions from the originating entity 140 of organization 135A to generate an envelope (also referred to as a document package) that will be sent to one or more receiving entities 150 of organization 135B. The envelope generation engine 230 may generate a document package that includes at least one document for execution. In an implementation, the envelope generation engine 230 may generate a document package that may also include a set of permissions corresponding to each document of the document package. In another implementation, the envelope generation engine 230 may generate a document package that identifies a first set of acting entities and for each acting entity a first set of tasks that each acting entity of the first set of acting entities is to perform with regards to the document package (for instance before the documents of the document package can be executed).

In some embodiments, the envelope generation engine 230 may provide the document package to one or more receiving entities 150 after the document package has been generated per a request from an originating entity 140. In alternative embodiments, the envelope generation engine 230 may provide the document package to one or more receiving entities 150 after the document package has been modified by the envelope modification engine 240. The envelope generation engine 230 may prevent the document package from being provided to a receiving entity of the one or more receiving entities 150 if the sensitivity model 270 indicates that there is a document in the package that has a sensitivity level for which the receiving entity is not authorized to perform operations (e.g., according to the originating entity's organization's policies). In one embodiment, the receiving entity's organization may authorize a sensitive document to be delegated but the originating entity's organization may not; the document system 110 can determine to override the policy of the receiving entity's organization.

The document system 110 may determine not to delegate a document package to a substitute receiving entity in response to determining that an override condition is met. In some embodiments, the override condition can be a rule set by a policy of originating entity 140. For example, a rule may specify that delegation is prohibited when a document has a particular sensitivity level, but is allowed when the document has a different sensitivity level. The envelope generation engine 230 may prevent the document from being provided to the substitute receiving entity. However, the envelope generation engine 230 may still provide the document to the intended receiving entity. The envelope generation engine 230 may determine a receiving entity's substitute receiving recipient(s) and provide a notification to the substitute receiving entity that a document package was prevented from being delegated to them due to the sensitivity of the document.

In some embodiments, the document system 110 allows an originating entity to manually enable and disable whether a document package is sent to a substitute receiving entity. In this way, the document system 110 may override a policy of the receiving entity's organization that allows the recipient entity to forward a document package to a substitute receiving entity. The manual override allows the originating entity to prevent any sensitive document from being seen and acted upon by a substitute receiving entity and provides security for the original receiving entity to be the only recipient. The document system 110 may use the interface engine 250 to provide a user interface enabling an originating entity to enable or disable the delegation of a document package to a receiving entity's substitute receiving entity.

The document system 110 may determine that a receiving entity has assigned multiple substitute receiving entities to delegate the execution of a document in the event that the receiving entity is unavailable. The envelope generation engine 230 may determine, based on rules that are specified by the policies of the receiving entity or the originating entity or based on rules selected by the receiving entity or the originating entity, a particular substitute receiving entity of the multiple substitute receiving entities to forward a document package rather than send the document package to each of the multiple substitute receiving entities. A rule may specify that if the document package includes document attributes meeting a particular criteria (e.g., including certain keywords, names, or financial amounts), that a substitute receiving entity having a particular title of authority receives the document package to execute on behalf of the intended receiving entity. In another example, a rule specified by a receiving entity may specify that if a contract amount is within a first range of values (e.g., less than 1 million), the document package is delegated to a first substitute receiving entity, if the contract amount is within a second range of values (e.g., between 1 and 1.5 million), the document package is delegated to a second substitute receiving entity, and if the contract amount is within a third range of values (e.g., greater than 1.5 million), the document package is delegated to a third substitute receiving entity. The interface engine 250 may generate a user interface for specifying these rules to the document system 110.

The document system 110 may determine a receiving entity, as specified by an originating entity, and determine that the receiving entity has not yet specified a substitute receiving entity. For example, the envelope generation engine 230 may query the account data store 210 for substitute receiving entities that have been assigned to the receiving entity and determine that none have been assigned. The document system 110 may determine that the receiving entity is unavailable to execute a document in a document package (e.g., by determining that the receiving entity has an Out of Office message active on an emailing service that is in communication with the document system 110 through an application programming interface of the document system 110). In response to determining that both the receiving entity is unavailable to execute and that no substitute receiving entity has been assigned to the receiving entity, the document system 110 may use a policy of the receiving entity's organization to determine to assign a substitute receiving entity to the receiving entity (e.g., automatically and without waiting for a confirmation from the receiving entity). For example, the organization's policy specifies that a substitute receiving entity of a particular title of authority in the receiving entity's department may be assigned as a substitute receiving entity automatically if no substitute receiving entity was assigned to the receiving entity at the time that they are determined to be unavailable to execute a document. Accordingly, the document system 110 may assign one or more substitute receiving entities automatically, per an organization's policy, and the envelope generation engine 230 may provide a document package to the newly assigned substitute receiving entity for execution on behalf of the receiving entity.

The envelope modification engine 240 manages modifications made to a document package. In some embodiments, the modifications are requested by a user 130 (e.g., by a receiving entity 150) and provided to an originating entity for approval. In some embodiments, the modifications are automatically applied by the envelope modification engine 240 after requested by a user (such as the receiving entity 150).

In an implementation, where a document package has been provided to one or more receiving entities 150, the envelope modification engine 240 may receive a request from a first receiving entity 150 to assign a set of document permissions to a second receiving entity. For example, the first receiving entity 150 (such as an employee) may review the document package via a user interface of a user device 160B associated with the first receiving entity 150 and may request to assign a set of document permissions to the second receiving entity (such as a manager of the employee) via the user interface. The envelope modification engine 240 may receive the request and determine if the set of document permissions are included within the one or more document permissions of the document package (e.g., within the one or more document permissions assigned by the originating entity 140). In an embodiment, where the envelope modification engine 240 determines the set of document permissions requested by the receiving entity 150 is included in the permissions assigned by the originating entity 140, the envelope modification engine 240 may automatically assign the set of document permissions to the second receiving entity. In an embodiment, where the envelope modification engine 240 determines the set of document permissions is not included in the permissions assigned by the originating entity 140, the envelope modification engine 240 may request that the originating entity 140 confirm that the second receiving entity can be assigned the set of document permissions before assigning the set of document permissions to the second receiving entity.

In an example embodiment, the document package includes at least one document and one or more document permissions assigned by the originating entity 140. In this embodiment, the document permissions include allowing a receiving entity to perform the following actions with regard to the document package: add one or more additional receiving entities 150 to the document package and update an order in which two or more receiving entities 150 may receive the document package. The receiving entity 150 is provided the document package via the envelope generation engine 230.

Continuing with this example embodiment, in a first scenario, the receiving entity 150 requests that a second receiving entity be able to update an order in which two or more receiving entities 150 may receive the document package. In a second scenario, the receiving entity 150 requests that a second receiving entity be able to add one or more additional documents to the document package. In the first scenario, the envelope modification engine 240 receives the request and automatically assigns to the second receiving entity a permission to update an order in which two or more receiving entities 150 may receive the document package as this permission was included in the one or more document permissions assigned by the originating entity 140. In the second scenario, the envelope modification engine 240 receives the request and requests that the originating entity 140 confirm that the second receiving entity can be assigned a permission to add one or more additional documents to the document package as this permission was not included in the one or more document permissions assigned by the originating entity 140.

In embodiments where the envelope modification engine 240 requests that the originating entity 140 confirm the assignment of document permissions to a second receiving entity, the envelope modification engine 240 may receive a confirmation from the originating entity 140 and may, in response, assign the document permissions to the second receiving entity. In some embodiments, the envelope modification engine 240 may then provide the document package with the set of approved document permissions to the second receiving entity. In alternative embodiments, the envelope modification engine 240 may receive an indication from the originating entity 140 that the second receiving entity cannot be assigned the document permissions. The envelope modification engine 240 may provide a notification to the receiving entity 150 that the second receiving entity cannot be assigned the document permissions.

In another implementation, the envelope modification engine 240 may automatically apply modifications to the document package. In an embodiment, the document package generated by the envelope generation engine 230 includes at least one document to be executed and identifies a first set of acting entities (e.g., one or more receiving entities 150 of organization 135B), and for each acting entity, the document package also identifies a first set of tasks that the acting entity is to perform with regard to the document package. For example, the document package may specify two acting entities in the first set of acting entities with one entity to perform a review of the at least one document in the document package and a second entity to sign the at least one document.

The envelope modification engine 240 may access a policy of the organization 135B stored in the account data store 210. As described above, a policy of an organization may specify which entities within the organization are to receive document packages and a set of tasks the entities may perform in relation to the document package. In order to determine if the document package should be modified to be sent to additional entities within organization 135B, the envelope modification engine 240 scans the document package. During the scan, the envelope modification engine 240 scans the document(s) and the first set of acting entities defined by the originating entity 140 during generation of the document package. In some embodiments, the envelope modification engine 240 may scan the at least one document to determine whether the at least one document is of one or more document types identified in the policy of the organization 135B and may scan the first set of acting entities to determine whether the set includes the entities identified in the policy per document type. The document types are categories of documents and may include a purchase agreement, a confidentiality agreement, a rental agreement, an employee agreement, a sales contract, a bank form, and the like. In response to the document package including a document of the one or more document types identified by the policy and the first set of acting entities not including one or more entities defined by the policy for the document type, the envelope modification engine 240 may automatically modify the first set of acting entities to include one or more additional entities (e.g., a second set of acting entities) based on the policy. The envelope modification engine 240 may perform this modification without requesting permission or confirmation from the originating entity 140.

In some embodiments, the envelope modification engine 240 may receive a sensitivity level as determined by the sensitivity model 270 and modify a document in a document package based on the sensitivity level. The sensitivity level may correspond to a particular type of sensitive content that may be removed or abstracted from the document, altering the sensitivity level of the document to another sensitivity level for which the substitute receiving entity may be authorized to perform actions on behalf of the receiving entity. For example, the envelope modification engine 240 receives a determined third sensitivity level from the sensitivity model 270, where a third sensitivity level indicates that an employee's salary is included in the document. The envelope modification engine 240 may determine, based on the third sensitivity level and the association with salaries, locations in a document where a salary is located. The envelope modification engine 240 may remove the salary or replace it with an abstraction (e.g., "[redacted]"). In this way, a partial redaction of sensitive information may enable a document to be timely executed without compromising sensitive information.

In an example scenario, the generated document package may include a purchase agreement and a first set of acting entities that includes one receiving entity 150 at organization 135B who is to perform a set of tasks including to review and sign the purchase agreement. The envelope modification engine 240 accesses a policy of organization 135B associated with receiving entity 150. The policy identifies sets of acting entities corresponding to a purchase agreement (a document type). Each set of acting entities identified in the policy also correspond to sets of tasks that each acting entity is to perform before the at least one document can be executed. The envelope modification engine 240 scans the document package and determines the document to be a purchase agreement and the first set of acting entities to not include two acting entities identified in the policy corresponding to a purchase agreement. As such, the envelope modification engine 240 automatically modifies the first set of acting entities to include the two acting entities. The modified document package may be provided to the first set of acting entities and the two acting entities (e.g., a second set of acting entities) where the first set of acting entities can review and sign the purchase agreement and the second set of acting entities can perform the set of tasks identified in the policy (e.g., initial the purchase agreement).

In some embodiments, the envelope modification engine 240 may scan the document(s) of the document package to determine whether the document(s) includes one or more types of document content identified by the policy. The envelope modification engine 240 may scan a document by identifying text of the at least one document (e.g., using object recognition techniques) and performing natural language processing on the identified text (e.g., using a heuristic solution, a machine-learned model, etc.) to identify the one or more types of document contents. A type of document content is words, phrases, clauses, or other content and may include a payment amount, a payment term, a late payment penalty, a limited liability clause, a product or service, and the like. In response to the document package including at least one type of document content identified by the policy, the envelope modification engine 240 may automatically modify the first set of acting entities to include one or more additional entities (e.g., a third set of acting entities) based on the policy.

In an example scenario, the generated document package may include a sales contract and a first set of acting entities that includes one receiving entity 150 at organization 135B who is to perform a set of tasks including reviewing and signing the sales contract. The envelope modification engine 240 accesses a policy of organization 135B and identifies a set of acting entities (e.g., a second set of acting entities) corresponding to a sales contract (a document type) and a set of acting entities (e.g., a third set of acting entities) corresponding to a payment amount (a type of document content) and a payment term (another type of document content). Each set of acting entities identified in the policy also corresponds to sets of tasks that each acting entity is to perform before the at least one document can be executed. The envelope modification engine 240 scans the document package and determines the document to be a sales contract and to include a payment term identified by the policy. Based on the scan, the envelope modification engine 240 determines the first set of acting entities does not include one acting entity of the second set and one acting entity of the third set. In response, the envelope modification engine 240 automatically modifies the first set of acting entities to include the two acting entities. The modified document package may be provided to the first set of acting entities and the two acting entities where the first set of acting entities can review and sign the sales contract and the two acting entities (one from the second set and one from the third set) can perform the set of tasks identified in the policy (e.g., initialing the purchase agreement).

In some embodiments, where a document includes a payment amount as a type of document content, the envelope modification engine 240 compares the payment amount to a threshold payment amount included in the policy. In response to the payment amount being greater than the threshold payment amount, the envelope modification engine 240 may automatically modify the first set of acting entities to include one or more additional entities based on the policy. For example, the policy of organization 135B specifies a threshold payment amount of $500,000, a set of acting entities at organization 135B corresponding to the threshold payment amount, and a set of tasks for the acting entities to perform. The envelope modification engine 240 identifies a payment amount of $1 million in a document of a document package to be sent to organization 135B and compares the payment amount to the threshold payment amount. Based on the comparison, the envelope modification engine 240 automatically modifies a first set of acting entities to include the set of acting entities specified in the policy corresponding to the threshold payment amount.

In some embodiments, where a document includes a payment term as a type of document content, the envelope modification engine 240 compares the payment term to a threshold payment term included in the policy. In response to the payment term being greater than the threshold payment term, the envelope modification engine 240 may automatically modify the first set of acting entities to include one or more additional entities based on the policy. For example, the policy of organization 135B specifies a threshold payment term of 30 days, a set of acting entities at organization 135B corresponding to the threshold payment term, and a set of tasks for the acting entities to perform. The envelope modification engine 240 identifies a payment term of 60 days in a document of a document package to be sent to organization 135B and compares the payment term to the threshold payment term. Based on the comparison, the envelope modification engine 240 automatically modifies a first set of acting entities to include the set of acting entities specified in the policy corresponding to the threshold payment term.

In some implementations, where the document package has been provided to one or more receiving entities 150, the envelope modification engine 240 may receive an indication that a receiving entity 150 is unavailable to execute the at least one document of the document package. In some embodiments, the envelope modification engine 240 may receive an out of office message from an email account associated with the receiving entity 150. In some embodiments, the envelope modification engine 240 may receive a message from the organization 135B indicating that the receiving entity 150 is unavailable. In some embodiments, the envelope modification engine 240 may determine the receiving entity 150 is unavailable based on the receiving entity 150 not accessing the document package within a threshold amount of time (e.g., 12 hours, 24 hours, etc.).

In response to receiving the indication, the envelope modification engine 240 may identify a substitute receiving entity 150 within the organization 135B to provide the document package to. The envelope modification engine 240 may identify the substitute entity based on one or more rules of the organization 135B. The one or more rules specify how the envelope modification engine 240 is to identify a substitute entity to provide the document package to when a receiving entity 150 is unavailable. For example, one rule may specify that the envelope modification engine 240 identifies a substitute entity by querying the org chart of the organization 135B stored in the account data store 210 and identifying an entity within the org chart that satisfies one or more document package requirements as the substitute entity.

The one or more document package requirements are necessary conditions that a substitute entity should satisfy. The one or more document package requirements may include a threshold title, a threshold role, and/or a threshold department. In some embodiments, the threshold title, the threshold role, and the threshold department are dynamic and may be based on the title, role, and department of the receiving entity 150. In some embodiments, the threshold title, the threshold role, and the threshold department are set by the organization 135B of the receiving entity 150 regardless of the title, role, and department of the receiving entity 150. The envelope modification engine 240 may review the org chart and select an entity as a substitute entity when the entity's title, role, and/or department meets or exceeds the threshold title, role, and/or department. For example, a threshold title is 'Level II Sales Manager,' a threshold role is sales contracts review, and a threshold department is Sales and a substitute entity must have a title of at least a 'Level II Sales Manager' and must satisfy the threshold role and threshold department.

In another example, a second rule may specify that the envelope modification engine 240 identify a substitute entity that is a supervisor or manager of the organization 135B. The envelope modification engine 240 may determine this by querying the various user accounts of individuals within the organization 135B from the account data store 210 or by querying an org chart of the organization 135B, and/or by identifying entities with a title that includes 'supervisor' or 'manager'.

In some embodiments, the envelope modification engine 240 may identify a substitute entity by receiving an identity of a candidate substitute entity from the organization 135B. The envelope modification engine 240 may provide the identity of the candidate substitute entity to the originating entity 140 for approval. Based on receiving approval from the originating entity 140, the envelope modification engine 240 may select the entity as the substitute entity.

Once a substitute entity is identified, the envelope modification engine 240 may modify the document package based on the identified substitute entity. In some embodiments, the envelope modification engine 240 may update the recipient information of the document package to include the substitute entity's contact information. In some embodiments, the envelope modification engine 240 may change information associated with the receiving entity 150 within a document included in the document package to corresponding information associated with the substitute entity. For example, the envelope modification engine 240 may update a signature field within the document to include the substitute entity's information (name, title, etc.).

The interface engine 250 may generate user interfaces allowing users 130 to interact with document packages managed by the document system 110. For example, the interface engine 250 may generate a user interface for an originating entity 140 to generate a document package. In another example, the interface engine 250 may generate a user interface for a receiving entity 150 to view a document package. In some implementations, the interface engine 250 may provide a user interface enabling a receiving entity 150 to modify a document package. For example, the interface engine 250 may display a listing of the one or more receiving entities 150 of the document package to a receiving entity 150 on an electronic display of a user device 160B. The interface engine 250 may provide one or more interface elements (e.g., links, buttons, checkboxes, etc.) on the electronic display for the receiving entity 150 to select in order to request to assign a set of document permissions to an additional receiving entity 150. In some implementations, the interface engine 250 may generate a user interface for displaying a notification to a receiving entity 150 that an additional receiving entity 150 cannot be assigned the set of document permissions. The interface engine 250 and an example user interface will be discussed further in relation to FIGS. 4-7.

The model training engine 260 trains a model to identify sensitive documents. In some embodiments, the model training engine 260 trains the model to determine a sensitivity level of a document. The model training engine 260 may train a machine learning model in multiple stages. In a first stage, the model training engine 260 may use records of previously distributed documents and corresponding receiving entities collected across one or more users to train a machine learning model. This data from a population of users may be referred to as "general data" or "generalized data." The model training engine 260 may label the general data with a label representative of a sensitivity level of the historical document. In addition to using a document to train a machine-learned model, the model training engine 260 may also use a document package, collective document attributes of the documents within the package, and entity attributes of recipients of the document package.

By using a combination of document and entity attributes, the document system can increase the accuracy at which the machine-learned model can determine the likelihood that a document is sensitive in addition to refining the distribution decision of sensitive documents to substitute receiving entities. In some embodiments, the machine-learned model can determine how a document containing sensitive information (e.g., as indicated by document attributes) is sensitive relative to the recipient of the document. For example, medical information may be sensitive information that one type of substitute entity (e.g., a supervisor) should not see but is okay for a different type of substitute entity (e.g., the assistant) to see. In an example scenario where a receiving entity has established both a supervisor and an assistant as substitute receiving entities, the document system may determine to provide the document to the assistant but not the supervisor. This way, the document system maintains the security of the sensitive information while avoiding delays that may be caused by simply prohibiting the sensitive information to be sent to any substitute receiving entity while the intended recipient is unavailable to execute a sensitive document. Furthermore, the document system has determined how a sensitive document is relative to a recipient. For example, the sensitivity level of a document may be a first level relative to entity attributes of the supervisor and a second level relative to the entity attributes of the assistant.

The model training engine 260 may create a first training set based on the labeled general data. The model training engine 260 trains a machine learning model (e.g., the sensitivity model 270), using the first training set, to determine a sensitivity level of a document or document package. In some embodiments, the machine learning model is configured to receive, as an input, a feature vector of document or entity attributes, and output a sensitivity level associated with the document package (e.g., a sensitivity level of a document in a document package). The envelope generation engine 230 or the model training engine 260 may determine a feature representations of documents or entities, which is further described below with respect to creating a training set.

In a second stage of training, the model training engine 260 can use user-specific document packages and recipients to create a second training set. The model training engine 260 may use document attributes of the document packages and entity attributes of the recipients to determine labels for the user-specific data, where the labels correspond to respective sensitivity levels. If a previously determined sensitivity level by the trained model resulted in the prevention of distributing a document package to a substitute receiving entity that a receiving entity or an originating entity would have manually specified should not receive the document package, which may be determined by the document system 110 identifying that a user did not override the automated decision, the model training engine 260 may create the second training set that includes user-specific data labeled to indicate the sensitivity level of the document package was correctly identified by corresponding document or entity attributes. The model training engine 260 then trains the machine learning model using the second training set such that the machine learning model is customized to the user's desired categorization of documents into sensitivity levels.

To create a training set, the envelope generating engine 230 or the model training engine 260 may determine one or more feature vectors associated with document attributes or entity attributes. For example, the model training engine 260 may determine a document feature vector, which may be referred to as a "document feature representation," characterizing a document or document package. The document feature vector may be composed of numerical representations of document or entity attributes. For example, object recognition applied to a document may recognize a salary or other sensitive information within a document, and the presence of sensitive information within a document may be represented by a binary flag. In another example, content recognized by object recognition may be categorized into categories of sensitivity that may be user-specified or determined by the document system 110 (e.g., similar to the sensitivity levels), and the categories may correspond to respective numerical values that are used to generate a document feature vector.

In some embodiments, the model training engine 260 may retrain a machine-learned model using user feedback received from a user device of a receiving entity. The model training engine 260 receives feedback of a sensitivity level determined by the sensitivity model 270 or the distribution of a document package or lack thereof based on the determined sensitivity level indicating a measure of approval that the user has with the output of the sensitivity model 270. For example, the user may provide feedback through a GUI, where the feedback is an approval or rejection of the prevention of distributing a sensitive document to a substitute receiving entity. The model training engine 260 may modify an association between the determined sensitivity level and document or entity attributes used by the sensitivity model 270 to determine the sensitivity level. For example, in response to the user providing a measure of approval indicating disapproval, the model training engine 260 reduces weights applied to entity or document attributes. When the modified association, including the reduced weights, is used to retrain a machine-learned model, the model training engine 260 may cause a decrease in the likelihood of the same sensitivity level to be determined for a subsequently generated document package and a corresponding substitute receiving entity with similar attributes.

In response to the user providing a measure of approval indicating approval of the sensitivity determination, the model training engine 260 may increase a weight applied to document or entity attributes used to make the successful determination. For example, the model training engine 260 may increase the weight placed upon a title of authority (e.g., a job title) of a substitute receiving entity and the presence of sensitive text in a document after such attributes were used to successfully determine a manner of distributing a document package (e.g., preventing a sensitive document from being sent to a substitute receiving entity that should not receive the document). Examples of measures of approval may include direct feedback such as a rating of the distribution (e.g., a star rating system) or indirect feedback such as a request to modify the distribution (e.g., a request to send the document package to a substitute entity despite a determination by the document system 110 not to send the package), which may indicate disapproval with the sensitivity level determined by the sensitivity model 270.

The sensitivity model 270 determines a sensitivity level of a document. The sensitivity model 270 may categorize the sensitivity of a document according to levels. There may be two levels indicating whether the document contains or does not contain sensitive content. There may be more than two levels for various types of sensitive content. For example, a first sensitivity level may indicate that there is no sensitive content in a document, a second sensitivity level may indicate that there is a first type of sensitive content, and a third sensitivity level indicating that there is a second type of sensitive content. The types of content corresponding to respective sensitivity levels may be user-specified. For example, a user may specify that the contents of a classified business proposal are a first type of sensitive content and a salary is a second type of sensitive content. The model training engine 260 may determine the types of sensitive content of documents based on document and/or entity attributes and a clustering algorithm to determine respective attributes characterizing different types of sensitive content.

The document system 110 can determine to use the sensitivity model 270 in response to determining that a policy of a receiving entity's organization specifies that a substitute receiving entity is authorized to receive the document package. In one embodiment, a policy may specify that the substitute receiving entity is authorized during a certain time period. For example, a receiving entity submits their vacation schedule to their human resources department, where the organization authorizes substitute entities to execute documents on behalf of employees during their absence. In another embodiment, a policy may specify that the substitute receiving entity is authorized if the receiving entity has set up an automated reply to their emails (e.g., an out-of-office response). The document system 110 can determine if there is a substitute receiving entity that will be receiving a document package as the receiving entity's delegate. For example, the document system 110 may have access to the receiving entity's schedule (e.g., manually provided by the receiving entity or accessed by communicating with an organization's human resources system). In another example, the document system 110 may determine if any automated email responses have been received by the originating entity or the document system within a time window (e.g., within the past week) for document envelopes previously sent to the receiving entity. If a substitute receiving entity is actively assisting a receiving entity with executing documents, the document system 110 can apply the sensitivity model 270 to determine whether the document should be delegated. Else, the document system 110 may determine that the receiving entity is available to execute the document, sensitive or not, and skip applying the sensitivity model 270 to a document. In this way, the document system 110 can increase the efficiency at which processing resources are expended.

The sensitivity model 270 may be a machine-learned model trained using labeled representations of historical documents characterized by respective document attributes to determine the document package includes the at least one document categorized as sensitive, where labels of the labeled historical documents indicate respective sensitivity levels. The sensitivity model 270 may further output a confidence score indicating a likelihood that the sensitivity level is appropriately labeled as output. For example, the sensitivity model 270 may indicate that a document containing a residential address has a first sensitivity level with a confidence of 80%, has a second sensitivity level with a confidence of 30%, and has a third sensitivity level with a confidence of 5%. The document system 110 may maintain and apply multiple machine learned models for determining respective sensitivity levels. In some embodiments, the document system 110 may use the determined confidence score of the sensitivity levels and a threshold confidence score (e.g., 80%) to determine that a particular sensitivity level is appropriate for a document or document package. For example, the sensitivity level model 270, for a document, outputs a second sensitivity level with confidence score of 81%, and the document system 110 compares the score to a threshold confidence score of 80% to determine that the sensitivity level of the document is indeed the second sensitivity level.

Machine learning models of the document system 110 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, a supervised or unsupervised learning algorithm, or any suitable combination thereof.

Alternatively, the sensitivity model 270 may be a statistical model generated based on previously distributed documents and corresponding substitute recipients permitted to perform actions with regard to the documents. The sensitivity model 270 may determine a correlation between document attributes and entity attributes that are permitted to perform actions. Based on the determined correlation, the sensitivity model 270 may determine a likelihood that a given document with corresponding document attributes may be distributed to a particular receiving entity with corresponding entity attributes, indicating a sensitivity level of the document for the receiving entity.

Further yet, the model described herein may be a rules-based decision model that determines a sensitivity level of a document based on a test of various rules or conditions. In some embodiments, the sensitivity model 270 is a rules-based model that specifies at least one document is categorized into a sensitivity level based on document attributes or entity attributes. In a first example of applying rules to determine the sensitivity level of a document, a rule of the rules-based model specifies that a document is categorized into a sensitivity level in response to determining that an author of the document (e.g., an originating entity) has a job title associated with high sensitivity documents (e.g., a threshold title). In a second example, a rule of the rules-based model specifies that a document is categorized into a sensitivity level in response to determining that a text of the at least one document includes a compensation value (e.g., a salary) of a receiving entity.

Example Auditing System Architecture

Figure 3B:
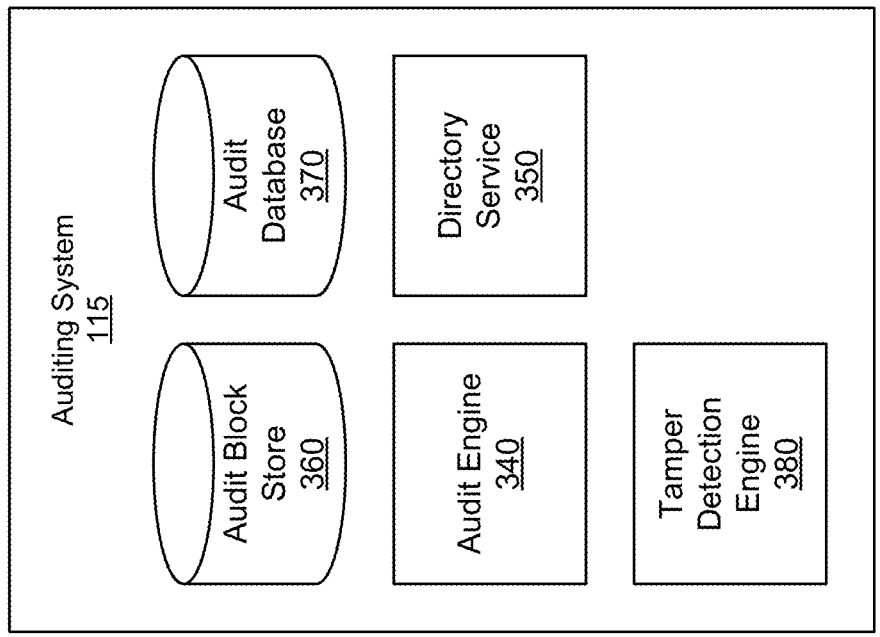
FIG. 3B illustrates a block diagram of the auditing system, according to one or more embodiments.
Figure 3A:
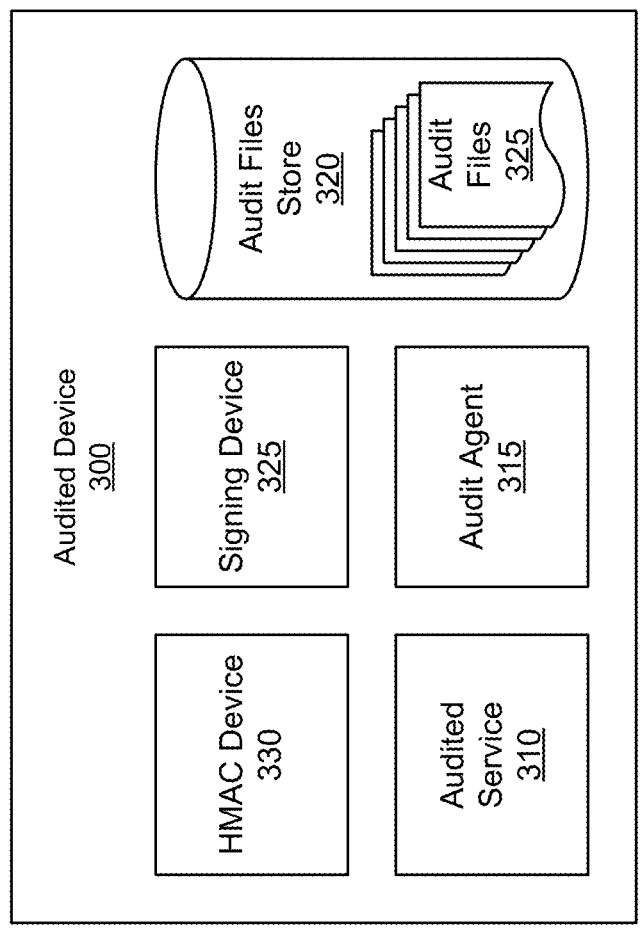
FIG. 3A illustrates a block diagram of an audited device, according to one or more embodiments.

FIG. 3A illustrates a block diagram of an audited device 300, according to one or more embodiments. Components of the audited device 300 may be a combination of hardware and software. In some embodiments, the audited device 300 is an online system, such as the document system 110 shown in FIG. 1. Alternatively, the audited device 300 may be a user device 160 shown in FIG. 1, or any other computing system.

The audited device includes an audited service 310, an audit agent 315, and audit files store 320, a hash-based message authentication code (HMAC) device 330, and a signing device 325. In various embodiments, the audited device 300 may include fewer or additional components that are not shown in FIG. 3A. For example, conventional components such as network interfaces, security functions, load balancers, failover servers, management and network operations consoles, and the like are not shown so as to not obscure the details of the system architecture. The functions of the audited device 300 may be distributed among the components in a different manner than described.

The audited service 310 includes applications that are configured to perform a set of actions. The audited service 310 generates audit files 325 each time a set of events occurs. For example, if the audited device 300 is the document system 110 of FIG. 1, the audited service 310 may be a computing service running one or more of the account data store 210, the envelope data store 220, the envelope generation engine 230, the envelope modification engine 240, the interface engine 250, the model training engine 260, and the sensitivity model 270. Moreover, the audited service 310 may generate audit files 325 corresponding to events associated with the creation of envelopes, the modification of envelopes, or the execution of documents contained in envelopes.

In some embodiments, the audited service 310 includes an audit module that detects whether an event that triggers the generation of an audit file has occurred, retrieves the information for logging the event in the audit file, and sends a request to the audit files store 320 to store the audit file containing the retrieved information. In some embodiments, the audit module uses a predetermined application programming interface (API) for communicating with the audit files store 320.

The audit files store 320 stores audit files 325 generated by the audited services 310. In some embodiments, the audit files 325 stored by the audit files store 320 correspond to events tracked by the audited service 310. Each audit file may include a message describing the event, an indication of the type of event associated with the audit file, a timestamp for the event associated with the audit file, an indication whether the event was successful (e.g., a Boolean value indicating success or failure), an identification of the application reporting the event associated with the audit file (e.g., an application name), an identification of the service the application reporting the event associated with the audit file is a part of (e.g., a service name), and an identification of a user associated with the event associated with the audit file. Moreover, if the audited device 300 is the document system 110 of FIG. 1, the audit files may additionally include an identification of an envelope associated with the tracked event, and an identification of an account associated with the tracked event (e.g., account that performed an action in the document system 110).

The audit agent 315 retrieves audit files 325 from the audit files store 320 sends the audit files 325 to the auditing system 115. In some embodiments, the audit agent 315 communicates with the audit engine 340 of the auditing system 115 to communicate the audit files 325 from the audited device 300 to the auditing system 115. In some embodiments, the audit agent 315 sends the audit files 325 in batches. That is, the audit agent 315 retrieves a set of audit files 325 stored in the audit files store 320 bundles the set of audit files 325 to generate an audit batch or audit block, and sends the audit block to the auditing system 115 for processing.

In some embodiments, the audit block generated by the audit agent 315 to send a set of audit files to the auditing system 115 includes an identification of the audited device 300 (e.g., a device ID), and the set of audit files or records. In some embodiments, the audit block generated by the audit agent 315 additionally includes a digital signature generated based at least on the set of audit files or records included in the audit block. The digital signature may be generated using a private key associated with the audit agent 315 or the audited device 300. The digital signature is generated by the signing agent 325 as described hereinbelow.

In some embodiments, the audit block generated by the audit agent 315 additionally includes a digital signature of an audit block that had been previously generated by the audit agent 315. In some embodiments, the audit agent 315 stores a digital signature of an audit block (e.g., in local storage or memory) and retrieves the stored digital signature when generating a subsequent audit block. That is, the audit agent 315 generates a first digital signature for a first audit block and stores the generated first digital signature. Subsequently, when generating a new audit block (e.g., a second audit block), the audit agent 315 retrieves the previous digital signature (e.g., from local storage or memory) and includes the previous digital signature in the current audit block (i.e., the new audit block). In some embodiments, the audit agent 315 generates a new digital signature for the new audit block and stores the new digital signature to be included in a following audit record (e.g., a third audit record). The audit agent 315 may replace the stored previous digital signature with the newly generated digital signature. As such, the audit agent 315 may only store a single digital signature at any given point in time. In other embodiments, instead of storing the digital signature of audit blocks, the audit agent 315 retrieves the digital signature of a previous audit block from the auditing system 115.

In some embodiments, the audit agent 315 waits for an acknowledgement from the auditing system 115 that the audit files 325 sent by the audit agent 315 were received and/or processed. Upon receiving the acknowledgement, the audit agent 315 may instruct the audit files store 320 to delete the audit files that were sent to the auditing system 115 and successfully processed by the auditing system 115.

The signing device 325 receives data as an input and generates a digital signature to authenticate the received input data. In some embodiments, the signing device 325 stores a private key used for generating the digital signatures. In some embodiments, the signing device 325 is registered with the directory service 350 of the auditing service (described in more detail hereinbelow). The signing device 325 may provide a public key corresponding to the private key used for generating the digital signatures to the directory service 350. The public key can be used to verify that a digital signature is valid and that it was generated by the signing device 325.

In some embodiments, the signing device 325 receives data from the audit agent 315 and generates a digital signature for the received data. For instance, the signing device 325 receives a payload (e.g., including a list of events or audit files or records) to be included in an audit block and generates the digital signature for the payload to compose the audit block.

The HMAC device 330 receives data as an input and generates a message authentication code (MAC). The MAC may be used for simultaneously verifying both data integrity and authenticity of the data. In some embodiments, the HMAC device 330 generates the MAC using a secret key. In some embodiments, the HMAC 325 uses symmetric cryptography to generate the MAC. That is, unlike a digital signature generated by the signing device 325, the same secret key used for generating the MAC is used for verifying the MAC and the data. By using symmetric cryptography, the HMAC device 330 can generate a MAC using less computational power than if an asymmetric cryptography algorithm were used.

In some embodiments, the signing device stores the secret key locally and is not shared with any other module or system. The HMAC device 325 generates a secret key during a startup process and stores the secret key locally. In other embodiments, the HMAC device 325 may use a key generation algorithm and generates a new key each time a new MAC is generated.

In some embodiments, the HMAC device 330 may additionally receive an input data and a MAC for the input data, and verifies whether the input data and the MAC are valid. For instance, the HMAC device 330 may generate a new MAC for the input data and may compare the new MAC with the received MAC. If the generated new MAC matches the received MAC, the HMAC device 330 confirms the integrity of the input data and the authenticity of the input data.

In other embodiments, to verify the integrity and authenticity of data, a module using the HMAC device 330 sends the data to the HMAC and receives an MAC for the data. The module can then compare the received MAC to an expected MAC. If the received MAC matches the expected MAC, the module confirms the integrity of the input data and the authenticity of the input data.

The HMAC device 330 may be used for verifying the integrity and authenticity of audit files 325. An audited service 310 communicates with the HMAC device 330 to generate a MAC for an audit file 325. The audited service 310 stores the audit file 325 together with the MAC for the audited file 325 in the audit files store 320. As such, the MAC for the audited file 325 can be used for verifying the integrity and authenticity of the audit file. For example, the audit agent 315 may retrieve an audit file 325 (e.g., for generating an audit block to be sent to the auditing system 115) and verifies the integrity and authenticity of the audit file using the MAC for the audit file prior to including the audit file in the audit block. In some embodiments, to verify the integrity and authenticity of an audit file 325, the audit agent 315 communicates with the HMAC device 330 (e.g., by sending the audit file 325 and optionally the MAC corresponding to the audit file). Since the HMAC device 330 is used for both generating the MAC and verifying the MAC, the HMAC device can verify the integrity and authenticity of audit files without sharing the secret key used for generating MACs. In some embodiments, the HMAC calculation is included as part of a hardware security module (HSM).

FIG. 3B illustrates a block diagram of the auditing system 115, according to one or more embodiments. The auditing system 115 may be implemented as a single server, or may be implemented as multiple servers in communication with each other, such as through the network 120. The auditing system includes an audit engine 340, a directory service 350, an audit block store 360, an audit database 370, and a tamper detection engine 380. In various embodiments, the auditing system 115 may include fewer or additional components that are not shown in FIG. 3B. For example, conventional components such as network interfaces, security functions, load balancers, failover servers, management and network operations consoles, and the like are not shown so as to not obscure the details of the system architecture. The functions of the audited device 300 may be distributed among the components in a different manner than described.

The audit engine 340 receives audit files 325 from the audit agent 315 of an audited device 300 and populates the audit block store 360 and the audit database 370. In some embodiments, the audit engine 340 receives the multiple audit files in an audit block. The audit block includes a batch of audit files 325 and information for verifying or authenticating the audit files. For example, an audit block includes a digital signature generated by the audit engine 315 of the audited device 300 based on the contents of the audit block (including the contents of each of the audit files 325 included in the audit block). In some embodiments, the audit engine 340 verifies or authenticates the audit block before further processing the audit block and the audit files contained in the audit block. For example, the audit engine verifies that the digital signature included in the audit block corresponds to the audit agent 315 of the audited device 300.

In some embodiments, after verifying or authenticating an audit block, the audit engine 340 extracts the audit files 325 contained in the audit block and processes each of the audit files. Since the audit block has been authenticated as being generated by the audit agent 315 of the audited device 300, the audit engine 340 does not have to verify or authenticate each of the individual audit files 325. As such, the audit agent 315 of the audited device 300 can generate the audit block without having to generate a separate digital signature for each of the individual audit files 325. This beneficially improves the efficiency of the audit agent 315 by reducing the workload of the audit agent 315 and improves the efficiency in the transfer of the audit files 325 between the audited device 300 and the auditing system 115 by reducing the amount of data being transfer between the two.

In some embodiments, upon processing the audit files 325 included in an audit block 325, the audit engine 340 sends a confirmation or acknowledgment to the audit agent 315 of the audited device 300. The confirmation may include an indication that all of the audit files included in the audit block were successfully processed. In some embodiments, the audit engine 340 sends an error message to the audit agent 315 of the audited device 300 if the processing of one or more audit files 375 included in an audit block fails. For example, the audit engine 340 sends an error message that lists the audit records that were not able to be processed. The error message may further include information about the reasons why the audit files were not able to be processed.

In some embodiments, the audit engine 340 sends a single acknowledgement message to the audit agent 340 of the audited device 300 for each audit block. The acknowledgment message includes an indication of whether every audit file in the corresponding audit block was successfully processed, or whether any of the audit files were unable to be processed. By sending a single acknowledgment for each audit block, the efficiency of the audit engine 340 is improved by reducing the workload of the audit engine 340, and the efficiency in the communication between the audit engine 340 and the audit agent 315 of the audited device 300 is also improved by reducing the amount of data being transferred between the two.

The directory service 350 stores public keys for each audit agent 315 that is configured to interact with the audit engine 340. Upon receiving an audit block from an audit agent 315, the audit engine 340 identifies the audit agent that sent the audit block, and requests the public key for the identified audit agent from the directory service. The directory service 350 receives requests from the audit engine 340, searches the public key, and sends the public key back to the audit engine 340.

The audit block store 360 stores audit blocks sent by audit agents 315 to the auditing system 115. In some embodiments, the audit blocks are stored by the audit engine 340 in the audit block store 360. For example, the audit engine 340 may instruct the audit block store 360 to store an audit block in response to authenticating or verifying the integrity of the audit block.

Figure 4:
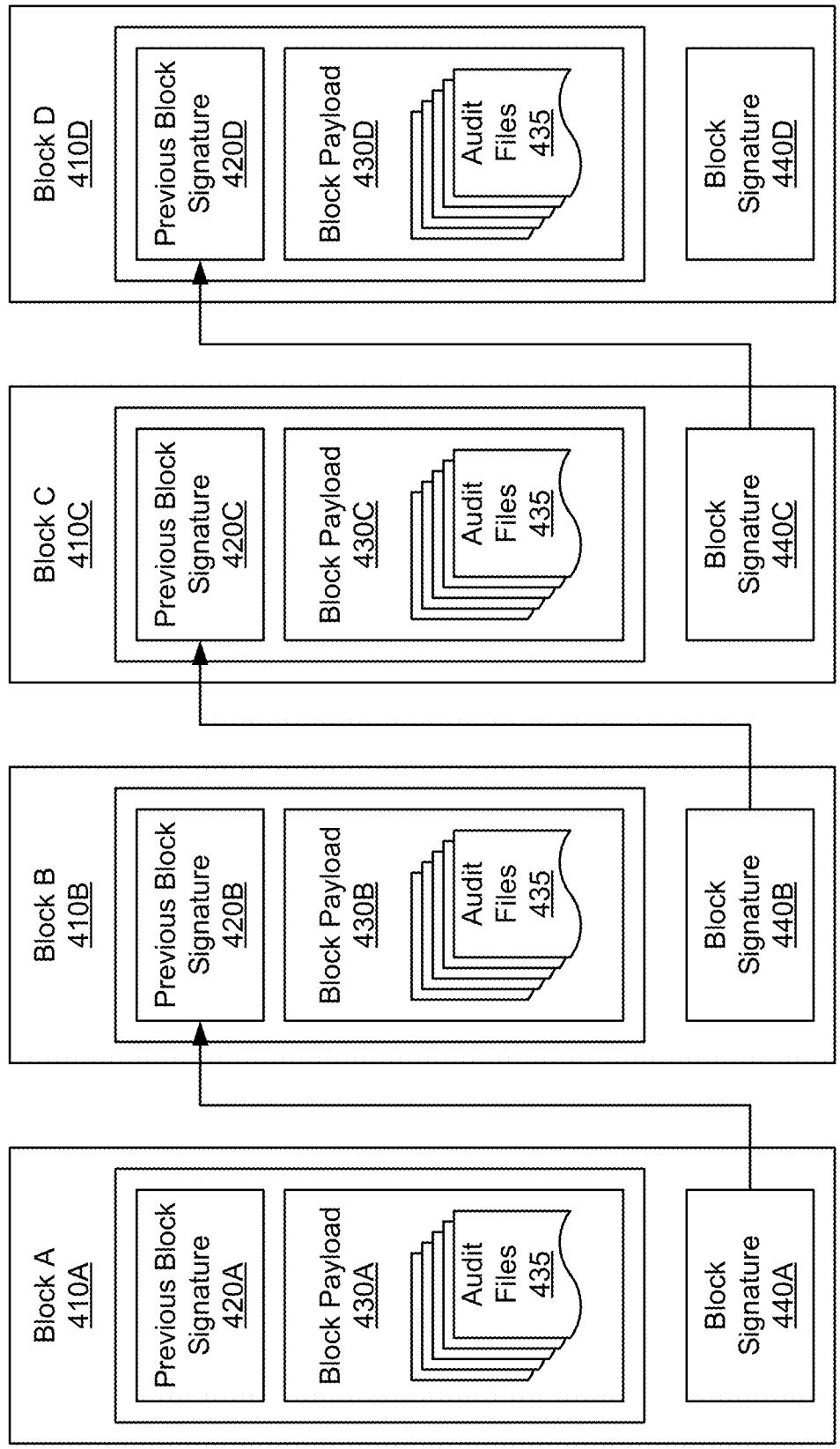
FIG. 4 illustrates a block diagram of a blockchain having multiple audit blocks linked together, according to one or more embodiments.

In some embodiments, the audit blocks corresponding to an audit agent 315 are linked to each other to form a blockchain. As used herein, a blockchain is a growing list or register of blocks linked together using cryptography (such as a digital signature). Each of the audit blocks generated by a given audit agent 315 stores information that links the audit block to a previous audit block generated by the given audit agent. In some embodiments, the audit blocks are linked using a digital signature generated by the audit agent. Each audit block stores the digital signature corresponding to a previous audit block and a new digital signature generated based on the digital signature corresponding to the previous audit block and at least a portion of the payload of the blockchain. The blockchain may be centralized (e.g., stored in a centralized system) or decentralized. FIG. 4 illustrates a block diagram of an audit blockchain having multiple audit blocks linked together, in accordance with one or more embodiments.

The audit database 370 stores audit records processed by the audit engine 340. In some embodiments, each audit record stored in the audit database 370 corresponds to an audit file 325 sent by an audit agent 315 to the audit engine 340. In some embodiments, the audit records stored by the audit database 370 are indexed and/or searchable. As such, a user of the auditing system 115 (such as a system administrator or auditor) is able to navigate and search through the audit records to perform an audit of the audited device 300.

The tamper detection engine 380 analyzes the audit block store 360 and the audit database 370 to determine if any of the audit blocks stored in the audit block store 360 or audit records stored in the audit database 370 have been tampered with. For example, the tamper detection engine 380 may traverse each audit blockchain stored in the audit block store 360 to determine whether any audit blockchain has been tampered with. In some embodiments, for each audit block of an audit blockchain, the tamper detection engine 380 verifies that the block signature included in the audit block is a valid signature, and verifies whether the previous block signature stored in the audit block matches the block signature of the preceding audit block. If the tamper detection engine 380 determines that the block signature is not a valid block signature (e.g., that the content of the audit block does not match the block signature), the tamper detection engine 380 may determine that the audit block has been tampered with, and may notify an administrator assigned to the tampered audit blockchain. In another example, if the tamper detection engine 380 determines that the previous block signature stored in a given audit block does not match the block signature of the audit block preceding the given audit block, the tamper detection engine X80 may determine that the audit block preceding the given audit block has been tampered with or deleted, and may notify an administrator assigned to the tampered audit blockchain.

In some embodiments, the tamper detection engine 380 compares each of the audit records stored in the audit database 370 to a corresponding audit file 435 stored in an audit block stored in the audit block store 360. For each audit record stored in the audit database 370, the tamper detection engine 380 identifies an audit block containing 410 a corresponding audit file 435, determines whether the audit block containing the corresponding audit file is available in the audit block store 360, retrieves the corresponding audit file 435, and compares the audit record to the retrieved corresponding audit file. If the tamper detection engine 380 does not find an audit block storing a corresponding audit file 435, or if the information contained in the corresponding audit file 4Y35 does not match the information included in the audit record, the tamper detection engine notifies an administrator. Alternatively, or in addition, the tamper detection engine 380 compares each audit file 435 stored in audit blocks stored in the audit block store 360 to audit records stored in the audit database 370. For each audit file 435 stored in each audit block 410 stored in the audit block store 360, the tamper detection engine 380 identifies a corresponding audit record stored in the audit database 370, and compares the audit record to the audit file 435. If the tamper detection engine 380 does not find a corresponding audit record, or if the information contained in the audit file 4Y35 does not match the information included in the audit record, the tamper detection engine notifies an administrator.

Example Audit Blockchain

FIG. 4 illustrates an example audit blockchain having multiple audit blocks linked together, in accordance with one or more embodiments. Each audit block 410 in the audit blockchain 400 has a block payload 430A storing a set of audit files 435. Additionally, each audit block 410 in the audit blockchain stores a previous block signature 420, and a block signature 440.

In some embodiments, the block signature 440 is generated based on the previous block signature 420 and the block payload 430. Moreover, the block signature 440 is generated using a private key of the audit agent 315 generating the audit block 410. In some embodiments, the block signature 440 is a digital signature generated using a cryptographic algorithm. For example, block B 410B includes the block signature 440A of block A as previous block signature 420B, and the block signature 440B of block B 410B is generated using the private key of the audit agent 315 and a combination of the previous block signature 420B (i.e., the block signature 440A of block A) and the block payload 430B. Similarly, block C 410C includes the block signature 440B of block B as previous block signature 420C, and the block signature 440C of block C 410C is generated using the private key of the audit agent 315 and a combination of the previous block signature 420C (i.e., the block signature 440B of block B) and the block payload 430C. In some embodiments, the first audit block or genesis audit block (e.g., block A 410A) of an audit blockchain 400 stores a default value as the previous block signature. In other embodiments, the genesis block of an audit blockchain 400 is a special block that stores configuration information for the audit blockchain and the audit agent 315 associated with the audit blockchain 400.

The block signature 440 allows uses of the auditing system 115 to confirm that the audit block 410 was generated by a specific audit agent 315. The private key corresponding to a given audit agent 315 is associated with a corresponding public key that is accessible through the directory service 350. Using the public key associated with the private key of an audit agent 315, the auditing system 115 and users of the auditing system 115 can verify that the signature included in a block 410 is a valid signature for the audit agent 315.

The block signature 440 is additionally used for chaining the audit blocks together. An audit block 410 stores the block signature 440 of a previous signature as the previous block signature 420, and the signature block of the audit block 410 is stored by a next audit block. As such, the audit block 410 is linked to the previous audit block and the next audit block. Moreover, since the audit block 440 of a given audit block 410 is generated based on a block signature of the audit block preceding the given audit block 410, the block signature 440 of the given audit block 410 prevents a modification or deletion of the previous audit block. That is, if the data (such as any of the audit files 435) stored in a given audit block (e.g., block A 410A) is modified, the block signature (e.g., block signature 440A) for the given audit block changes. Since the block signature of the given audit block is included in the next audit block (e.g., block B 410B), and the block signature is used for generating the block signature (e.g., block signature 440B) of the next audit block, the block signature of the next audit block is affected by the modification in the given audit block. Moreover, every audit block after the next block (e.g., block C 410C and block D 410D) is also affected by the modification in the given audit block.

In some embodiments, the block payload 430 additionally includes the MAC generated by the HMAC device 330 of the audited device 300 for each of the audit files 435 included therein. The MACs can then be used by the auditing system 115 to verify each of the audit files independently. To verify each of the audit files, the auditing system 115 sends a MAC verification request to the audited device 300 or the HMAC device of the audited device. The MAC verification request may include the MAC and the corresponding audit file or an identification of the audit file.

Audit Block Generation

Figure 5A:
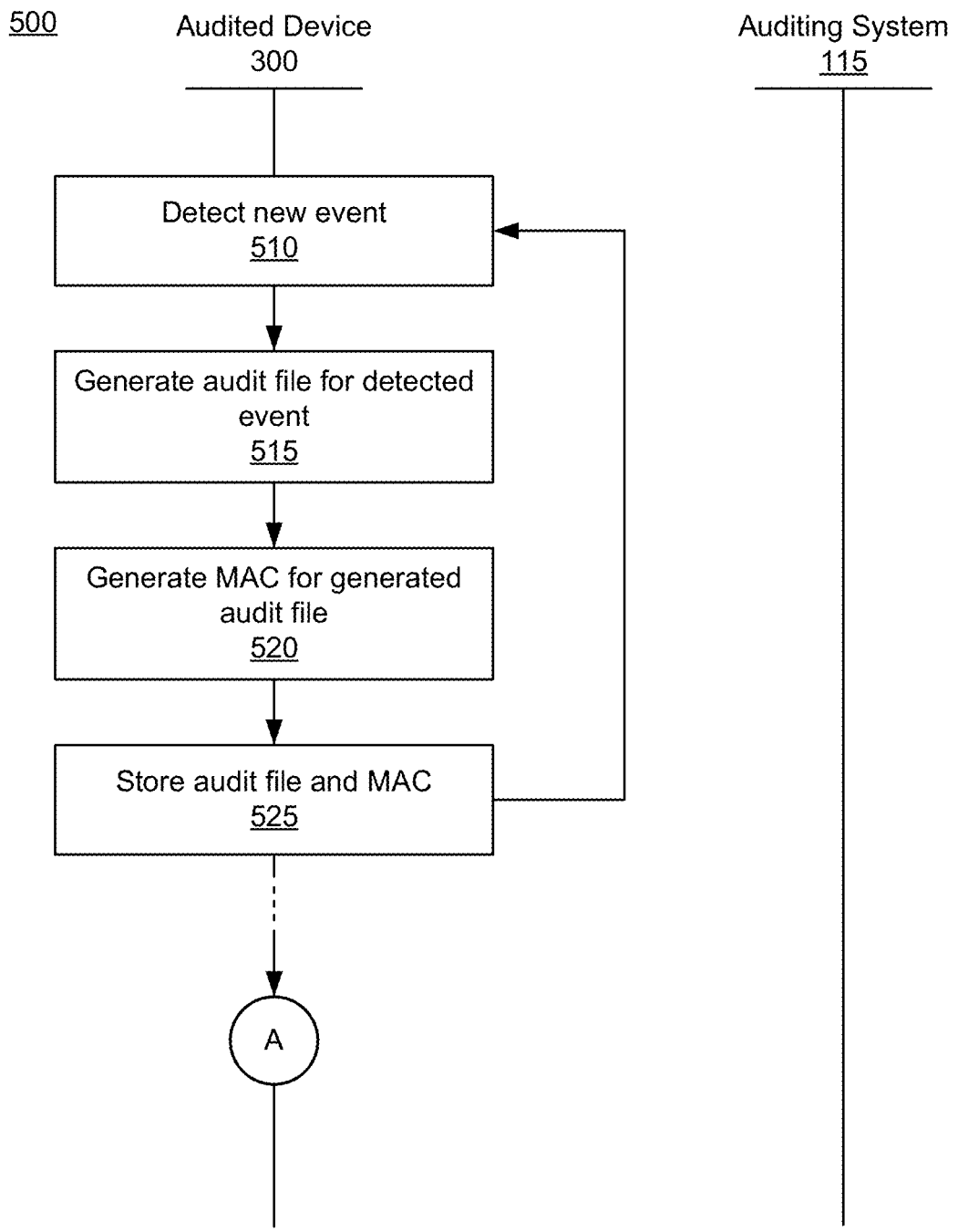

FIGS. 5A and 5B are a flowchart of a process 500 for generating an audit block for sending a batch of audit files from an audited device 300 to an auditing system 115, according to one or more embodiments. It should be noted that in other embodiments, the process 500 illustrated in FIGS. 5A-B can include fewer, additional, or different steps that those described herein.

The audited service 310 of the audited device 300 detects 510 a new event. In some embodiments, the audited service detects events corresponding to actions performed by users of the audited service 310. In some embodiments, the new event is detected by an audit module running on the audited service 310. For instance, the audit module may be configured to identify a set of actions performed by users of the audited service 310. In some embodiments, the audited service 310 may include multiple audit modules, each configured to detect a different event type. For example, a first audit module may be configured to detect users accessing resources managed by the audited service 310, and a second audit module may be configured to detect users completing a set of tasks in the audited service 310.

The audited service 310 of the audited device 300 generates 515 an audit file for the detected new event. The audited device 300 may retrieve information related to the detected event and may compile an audit record based on the retrieved information. In some embodiments, the information retrieved by the audited device is based on the event type of the detected new event.

The HMAC device 330 of the audited device 300 generates a MAC for the generated audit file. In some embodiments, the audited service 310 sends the generated audit file to the HMAC device 330 and instructs the HMAC device 330 to generate a MAC for the audit file. The HMAC device 330 generates the MAC for the audit file using a secret key. For example, the HMAC device 330 may generate the MAC for the audit file by combining the audit file with the secret key and applying a cryptographic hashing algorithm. In some embodiments, the HMAC device 330 may apply the cryptographic hashing algorithm multiple times. For example, the HMAC device 330 may generate the MAC as:

$$MAC = H(secret\_key \| H(secret\_key \| audit\ file))$$

Where H is a cryptographic hashing algorithm.

The audited service 310 then receives the MAC for the audit file 325. Upon receiving the MAC for the audit file, the audited service 310 stores 525 the generated audit file 325 in conjunction with the MAC for the audit file in the audited files store 320. In some embodiments, the audited service 310 modifies the audit file to include the MAC before storing the audit file in the audit files store 320. In other embodiments, the audit file and the MAC for the audit file are stored separately in the audit files store 320 together with an association between the audit file and the MAC for the audit file. Alternatively, the audited service 310 or the audit files store 320 creates an audit record that stores both the audit file and the MAC for the audit file.

This process may be repeated for every new event detected by the audited service 310 (or by an audit module running on the audited service 310). The audited service 310 may communicate with the audit files store 320 using a predetermined API and instructs the audit files store 320 to store the audit files and corresponding MACs for the audit files using the predetermined API. Moreover, the audit files store 320 may provide an acknowledgment to the audited service 310 upon receiving a request to store a new audit file or upon successfully storing a new audit file. Upon sending a request to store a new audit file, the audited service may wait for the acknowledgment, and if the audited service does not receive the acknowledgment before the request times out (e.g., before a predetermined amount of time), the audited service may resend the request to store the audit file to the audit files store 320.

Periodically, the audit agent 315 of the audited device 300 retrieves 530 a batch of audit files from the audit files store 320 to send the batch of audit files to the auditing system 115. For example, every set amount of time or at set times during the day, the audit agent 315 retrieves the batch of audit files to send the batch of audit files to the auditing system 115. Alternatively, the audit agent 315 may wait until a set number of audit files have been stored in the audit files store 320, or may wait for other signals or events before retrieving the batch of audit files from the audit files store 320 to send the batch of audit files to the auditing system 115.

The audit agent 315 verifies 535 each of the audit files in the batch of audit files retrieved from the audit files store 320. For example, for each audit file in the batch of audit files, the audit agent 315 sends a verification request to the HMAC device 330. The verification request may include the audit file (or a portion of the audit file) and the MAC for the audit file. The HMAC device 330 may then generate a new MAC for the audit file included in the request and compare the new MAC with the MAC included in the request. If the new MAC matches the MAC included in the request, the HMAC device 330 may return a message to the audit agent 315 indicating that the integrity and authenticity of the audit file has been verified. Conversely, if the new MAC does not match the MAC included in the request, the HMAC device 330 may return an error message to the audit agent 315 indicating that the audit file has been tampered with.

Alternatively, for each audit file, instead of sending a verification request, the audit agent 315 sends a request to the HMAC 330 device to generate a new MAC for the audit file. The request may include the audit file or a portion of the audit file. The HMAC device 330 calculates the MAC for the audit file and sends a message to the audit agent 315 with the new MAC. The audit agent 315 receives the new MAC for the audit file and compares the new MAC with the MAC retrieved from the audit files store 320. If the new MAC received from the HMAC device 330 matches the MAC retrieved from the audit files store 320, the audit agent 315 continues with the processing of the audit file. Alternatively, if the new MAC received from the HMAC device 330 does not match the MAC retrieved from the audit files store 320, the audit store determines that the audit file has been tampered with.

In some embodiments, if the audit agent 315 determines that an audit file has been tampered with (or receives an error message from the HMAC device 330 indicating that an audit file has been tampered with), the audit agent 315 sends a notification to a system administrator. Alternatively, if the audit agent 315 determines that an audit file has been tampered with, the audit agent 315 sends an error message to the auditing system 115. The auditing system 115 may then further process this determination (e.g., by sending a notification to a system administrator).

Using the verified audit files, the audit agent 315 generates 540 an audit block. To generate the audit block, the audit agent 315 may compile 542 a payload for the audit block including the verified audit files in the batch of audit files retrieved from the audit files store 320. The audit agent 315 may then send a request to the signing device 325 to generate 544 a digital signature for the audit block. The audit agent 315 receives the digital signature from the signing device 325 and generates the audit block based on the payload and the digital signature.

By sending a batch of audit files in an audit block, the audit agent can authenticate all of the audit files included in the audit block using a single digital signature. As such, the audited device 300 can avoid calculating a new digital signature for each audit file, increasing the efficiency of the system. In addition, by sending a batch of audit files in an audit block, the communication between the audited device 300 and the auditing system 115 is simplified, further increasing the efficiency of the system.

The audit agent 315 then sends 545 the audit block to the auditing system 115, and the auditing system 115 receives 550 the audit block from the audit agent 315. In some embodiments, the audit agent 315 sends the audit block to the audit engine 340 of the auditing system 115.

Upon receiving a new audit block, the audit engine processes 555 the audit block. For example, the audit engine 340 verifies the digital signature of the audit block to confirm the authenticity of the audit block. Moreover, the audit engine 340 extracts the audit files from the audit block and processes each of the audit files. The audit engine 340 may populate the audit database 370 based on information included in each of the audit files.

Upon processing of the audit block, the audit engine 340 sends 560 an acknowledgment to the audited device 300. For example, the audit engine 340 sends the acknowledgment to the audit agent 315 of the audited device 300. In some embodiments, the acknowledgment includes an identification of the audit block the acknowledgment corresponds to. The audit engine 340 may send an acknowledgment indicating successful processing of the audit block in response to verifying the authenticity of the audit block and successful processing of each audit file included in the audit block. Alternatively, the audit engine 340 may send an acknowledgment including an error message if the verification of the audit block fails or if the processing of any of the audit files included in the audit block fails. In some embodiments, the error message includes an explanation of the error in processing the audit block.

The audited device 300 receives 570 the acknowledgment from the auditing system 115 and processes the acknowledgment. For example, if the acknowledgment indicates that the audit engine 340 successfully verified the audit block and successfully processed every audit file in the audit block, the audit agent 315 deletes 570 the audit files that were sent to the auditing system 115 from the audit files store 320. Alternatively, if the acknowledgment indicates that one or more audit files were not successfully processed, the audit agent 315 may resend the audit files that were not successfully processed to the auditing system 115 in a new audit block. In some embodiments, the audit agent 315 determines which audit files were successfully processed by the auditing system 115 and which audit files were not successfully processed by the auditing system 115, and deletes the audit files that were successfully processed by the auditing system 115 from the audit file store 320.

Audit Blockchain Generation

Figure 6:
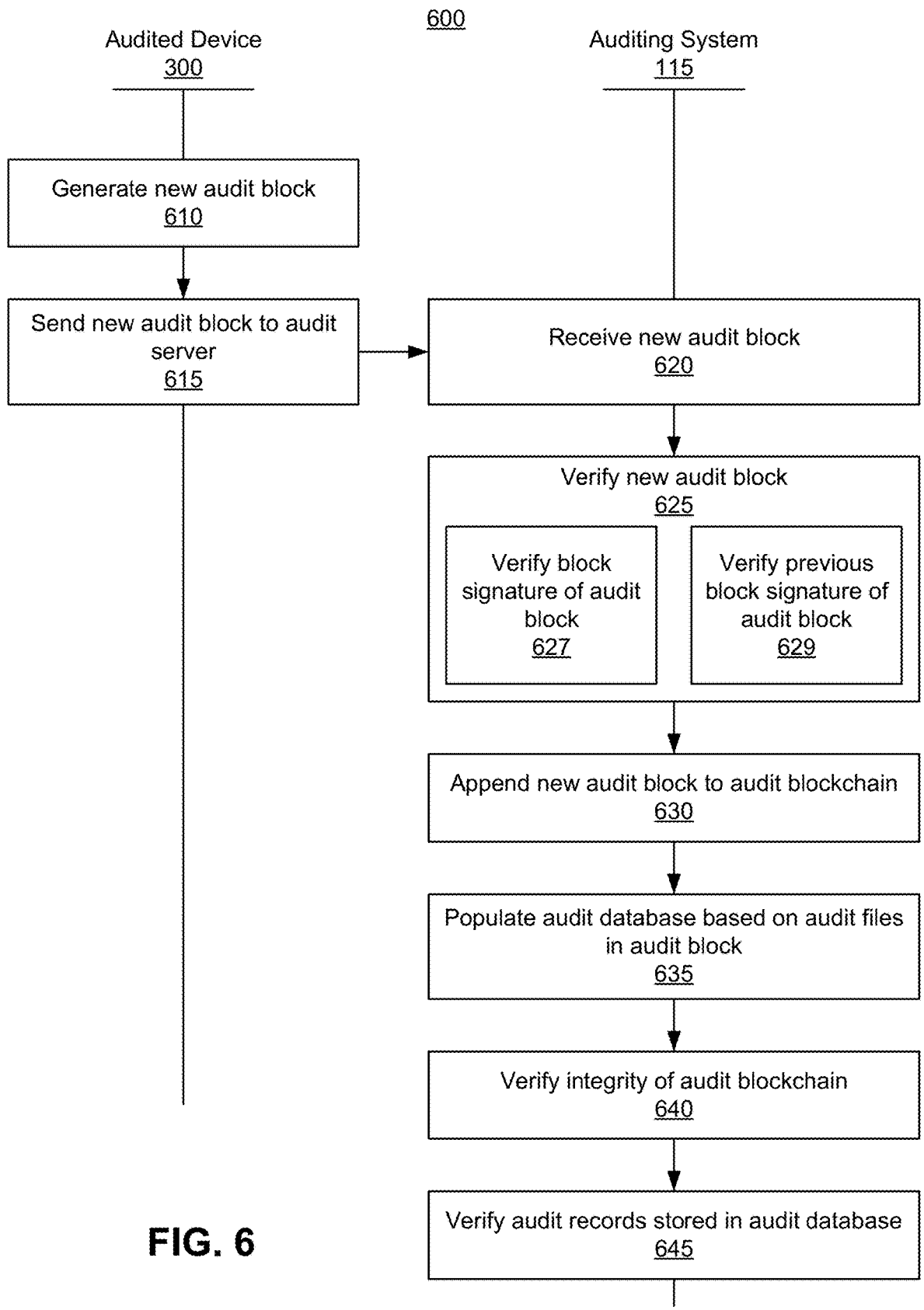
FIG. 6 is a flowchart of a process for generating an audit blockchain, according to one or more embodiments.

FIG. 6 is a flowchart of a process 600 for generating an audit blockchain, according to one or more embodiments. It should be noted that in other embodiments, the process 600 illustrated in FIG. 6 can include fewer, additional, or different steps that those described herein.

The audited device 300 generates 610 a new audit block and sends 615 the newly generated audit block to the auditing system 115. In some embodiment, the audit agent 315 of the audited device generates the new audit block. The audit block includes a payload, a digital signature, and a digital signature corresponding to a previous audit block.

The auditing system 115 receives 620 the new audit block generated by the auditing device 300. After receiving the audit block, the auditing system 115 verifies 625 the new audit block. For example, the audit engine 340 of the auditing system 115 verifies 627 the validity of the digital signature of the audit block. The audit engine 340 may identify the audited device 300 or audit agent 315 associated with the audit block and requests a public key associated with the audited device 300 or audit agent 315 from the directory service 350 for verifying the digital signature of the audit block. The audit engine 340 performs a verify operation on the digital signature included in the audit block using the public key received from the directory service 350.

In some embodiments, in addition to verifying the digital signature of the audit block, the audit engine 340 verifies 629 the previous block signature stored in the audit block. That is, the audit engine 340 compares the digital signature corresponding to the previous audit block included in the received audit block with the digital signature of the previous audit block stored in the audit block store 360. If the digital signature corresponding to the previous audit block included in the received audit block matches the digital signature of the previous audit block stored in the audit block store, the audit engine 340 determines that the audit block 625 is valid. In some embodiments, the audit engine 340 identifies an audit blockchain associated with the audited device 300 or the audit agent 315 of the audited device 300 to identify the previous audit block to verify the digital signature corresponding to the previous audit block included in the audit block.

After verifying the audit block, the auditing system 115 appends 630 the received audit block to an audit blockchain. In some embodiments, the audit engine 340 of the auditing system 115 sends the audit block to the audit block store 360. In some embodiments, the audit engine 340 identifies an audit blockchain associated with the audited device 300 or the audit agent 315 of the audited device 300 and instructs the audit block store 360 to append the received audit block to the identified audit blockchain.

Moreover, after verifying the audit block, the auditing system 115 populates 635 the audit database based on the audit files included in the audit block. For example, the audit engine 340 creates new audit records for each audit file included in the audit block. By creating audit records and populating the audit database based on the audit files included in the audit block, the auditing system 115 enables faster access to the information included in each of the audit files. Moreover, by creating audit records and populating the audit database based on the audit files included in the audit block, the auditing system 115 enables functionality such as the ability to search through the audit records or to query the audit database to enable more efficient usage of the information included in the audit files.

In some embodiments, the MAC generated by the HMAC device 330 of the audited device 300 is included in the audit block together with the audit files. The audit engine 340 may additionally store the MAC for each of the audit files to prevent modification of the stored audit files. The auditing system 115 may verify the integrity of each audit file by requesting the audited device 300 to verify the corresponding MAC stored in the audit database 370. Alternative, or in addition, the auditing system 115 generates a new MAC for each audit file stored in the audit database 370. For example, the auditing system 115 may include a second HMAC device (not shown) and the audit engine 340 may request the HMAC device of the auditing system to generate a new MAC for each of the audit files to be stored in the audit database. The HMAC device then generates a new MAC for each of the audit files based on a private key of the HMAC device. The audit engine 340 then stores an audit file, a corresponding MAC generated by the HMAC device of the auditing system, and an association between the audit file and the corresponding MAC generated by the HMAC device of the auditing system. In some embodiments, the MAC for the audit file is stored inside the new audit record created in the audit database for storing the audit file.

At a later time, the auditing system can then verify each of the audit files stored in the audit database by requesting the local HMAC device to verify the corresponding MAC stored in the audit database 370 for each of the audit files. As such, the auditing system 115 can verify each of the audit files without sending a request to the audited device and waiting a response, reducing the amount of data communicated between the auditing system 115 and the audited device 300, as well as reducing the workload of the audited device 300.

In some embodiments, tamper detection engine 380 additionally verifies 640 the integrity of the audit blockchain. For example, for each block in the audit blockchain, the tamper detection engine 380 verifies the validity of the digital signature included in the audit block and verifies that the digital signature corresponding to the previous block stored in the audit block matches the digital signature of the previous audit block. If the verification of the digital signature of the audit block fails, the tamper detection engine 380 may determine that the audit block has been modified or tampered with. If the verification that the digital signature corresponding to the previous block stored in the audit block matches the digital signature of the previous audit block fails, the tamper detection engine 380 may determine that the audit block preceding the audit block has been deleted or tampered with. Moreover, if the verification of the audit blockchain fails, the tamper detection engine 380 may notify a system administrator indicating that the audit blockchain has been tampered with.

Moreover, in some embodiments, the tamper detection engine 380 verifies 645 the audit records stored in the audit database 645. For example, for each audit record stored in the audit database, the tamper detection engine 380 may identify a corresponding audit blockchain, and may search the audit blockchain to determine if the audit blockchain includes an audit block containing an audit file corresponding to the audit record. If the tamper detection engine 380 determines that the audit blockchain does not contain an audit file that corresponds to the audit record, the tamper detection engine 380 may notify a system administrator. If the tamper detection engine 380 finds an audit file that corresponds to the audit record, the tamper detection engine 380 compares the audit file to the audit record. If the information stored in the audit record does not match the information stored in the audit file, the tamper detection engine 380 notifies the system administrator.

Alternatively, or in addition, for each audit file of each audit block of an audit blockchain, the tamper detection engine may search the audit database to determine whether a corresponding audit record exists. If the tamper detection engine determines that the audit database does not include an audit record that corresponds to the audit file, the tamper detection engine 380 may notify a system administrator. If the tamper detection engine 380 finds an audit record that corresponds to the audit file, the tamper detection engine 380 compares the audit record to the audit file. If the information stored in the audit record does not match the information stored in the audit file, the tamper detection engine 380 notifies the system administrator.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, by a centralized records auditing system, an audit block, the audit block comprising one or more audit files generated by an audit agent running in an audited device, a first digital signature corresponding to a previous audit block, and a second digital signature generated based at least on the one or more audit files and the first digital signature, the centralized records auditing system including an audit block store having an audit register;
   verifying, by the centralized records auditing system, an integrity of the received audit block, wherein verifying the integrity of the received audit block comprises:
      identifying the previous audit block in the audit register;
      retrieving the second digital signature stored in the identified previous audit block; and
      comparing the first digital signature stored in the received audit block with the retrieved second digital signature stored in the identified previous audit block;
   responsive to verifying the integrity of the received audit block:
      storing, by the centralized records auditing system, the received audit block in the audit register, the audit register comprising a plurality of audit blocks, each audit block of the audit register linked to a second audit block preceding the audit block by the second digital signature of the second audit block, and
      adding, by the centralized records auditing system, the one or more audit files included in the audit block to an audit database of the centralized records auditing system that is operatively coupled to the audit block store; and
   responsive to determining a trigger condition is met, verifying, by the centralized records auditing system, the integrity of the audit register, wherein verifying the integrity of the audit register comprises, for each audit block of the plurality of audit blocks of the audit register:
      verifying the second digital signature of the audit block, and
      comparing the first digital signature corresponding to the previous audit block and stored in the audit block with the second digital signature stored in the previous audit block.

2. The method of claim 1, wherein verifying the integrity of the received audit block further comprises: retrieving a public key associated with the audited device;
   and verifying the second digital signature stored in the audit block using the retrieved public key.

3. The method of claim 1, wherein identifying the previous block in the audit register comprises: identifying the audit register associated with the audit agent that generated the audit block; and identifying a last audit block in the identified audit register.

4. The method of claim 1, wherein adding the received audit block to the audit register comprises: storing the audit block in the audit block store storing other audit blocks of the audit register.

5. The method of claim 1, wherein adding the one or more audit files included in the audit block to the audit database comprises:
   for each audit file included in the audit block:
      generating at least one audit record based on information included in the audit file; and
      storing the generated audit record in the audit database.

6. The method of claim 1, further comprising: responsive to verifying the integrity of the received audit block, sending an acknowledgment message to the audit agent of the audited device.

7. The method of claim 1, wherein the trigger condition is a set amount of time elapsing from a previous verification of an integrity of the audit register.

8. The method of claim 1, further comprising:
   responsive to determining the trigger condition is met, verifying the audit database, wherein verifying the audit databases comprises,
      for each audit record stored in the audit database:
         identifying an audit file stored in an audit block of the audit register, and
         comparing information stored in the audit record with information stored in the identified audit file.

9. The method of claim 1,
   responsive to determining the trigger condition is met, verifying the audit database, wherein verifying the audit database comprises for each audit file of a plurality of audit files stored in each audit block of the audit register:
      identifying an audit record stored in the audit database, and
      comparing information stored in the identified audit record with information stored in the audit file.

10. The method of claim 1, wherein the audit register comprises a blockchain.

11. The method of claim 10, wherein the audit register comprises a centralized blockchain.

12. The method of claim 1, wherein the first digital signature stored in the audit block is stored as the second digital signature in the previous audit block.

13. IThe method of claim 1, wherein the second digital signature is generated by applying a cryptographic signing algorithm using a private key to a message including the one or more audit files and the first digital signature.

14. Non-transitory computer-readable storage media storing executable instructions that, when executed by a hardware processor, cause the processor to perform steps comprising:
   receive, at a centralized records auditing system, an audit block, the audit block comprising one or more audit files generated by an audit agent running in an audited device, a first digital signature corresponding to a previous audit block, and a second digital signature generated based at least on the one or more audit files and the first digital signature, the centralized records auditing system including an audit block store having an audit register;

verify, at the centralized records auditing system, an integrity of the received audit block, wherein to verify the integrity of the received audit block, the instructions cause the hardware processor to:
identify the previous audit block in the audit register;
retrieve the second digital signature stored in the identified previous audit block; and
compare the first digital signature stored in the received audit block with the retrieved second digital signature stored in the identified previous audit block;

responsive to verifying the integrity of the received audit block, at the centralized records auditing system:
store the received audit block in the audit register, the audit register comprising a plurality of audit blocks, each audit block of the audit register linked to a second audit block preceding the audit block by the second digital signature of the second audit block, and
add the one or more audit files included in the audit block to an audit database of the centralized records auditing system that is operationally coupled to the audit block store; and responsive to determining a trigger condition is met, verify the integrity of the audit register, wherein to verify the integrity of the audit register, the instructions cause the hardware processor to, for each audit block of the plurality of audit blocks of the audit register:
verify the second digital signature of the audit block, and
compare the first digital signature corresponding to the previous audit block stored in the audit block with the second digital signature stored in the previous audit block.

15. The non-transitory computer-readable storage media of claim 14, wherein to add the one or more audit files included in the audit block to the audit database the instructions cause the hardware processor to:
for each audit file included in the audit block:
generate at least one audit record based on information included in the audit file; and
store the generated audit record in the audit database.

16. The non-transitory computer-readable storage media of claim 14, wherein the instructions further cause the hardware processor to:
responsive to verifying the integrity of the received audit block, send an acknowledgment message to the audit agent of the audited device.

17. The non-transitory computer-readable storage media of claim 14, wherein the instructions further cause the hardware processor to:

responsive to determining the trigger condition is met, verify the audit database, wherein to verify the audit database the instructions cause the hardware processor to, for each audit record stored in the audit database:
identify an audit file stored in an audit block of the audit register, and
compare information stored in the audit record with information stored in the identified audit file.

18. A document system comprising processing circuitry and a non-transitory computer-readable storage media storing instructions that, when executed by the processing circuitry, cause the processing circuitry:
receive, at a centralized records auditing system, an audit block, the audit block comprising one or more audit files generated by an audit agent running in an audited device, a first digital signature corresponding to a previous audit block, and a second digital signature generated based at least on the one or more audit files and the first digital signature, the centralized records auditing system including an audit block store having an audit register;

verify, at the centralized records auditing system, an integrity of the received audit block, wherein to verify the integrity of the received audit block, the instructions cause the processing circuitry to:
identify the previous audit block in the audit register;
retrieve the second digital signature stored in the identified previous audit block; and
compare the first digital signature stored in the received audit block with the retrieved second digital signature stored in the identified previous audit block;

responsive to verifying the integrity of the received audit block, at the centralized records auditing system:
store the received audit block in the audit register, the audit register having a plurality of audit blocks, each audit block of the audit register linked to a second audit block preceding the audit block by the second digital signature of the second audit block, and
add the one or more audit files included in the audit block to an audit database of the centralized records auditing system that is operationally coupled to the audit block store; and responsive to determining a trigger condition is met, verify the integrity of the audit register, wherein to verify the integrity of the audit register, the instructions cause the processing circuitry to, for each audit block of the plurality of audit blocks of the audit register:
verify the second digital signature of the audit block, and
compare the first digital signature corresponding to the previous audit block stored in the audit block with the second digital signature stored in the previous audit block.

* * * * *

UNITED STATES PATENT AND TRADEMARK OFFICE
CERTIFICATE OF CORRECTION

| | | |
|---|---|---|
| PATENT NO. | : 11,940,984 B2 | Page 1 of 1 |
| APPLICATION NO. | : 17/549578 | |
| DATED | : March 26, 2024 | |
| INVENTOR(S) | : Ezer Farhi et al. | |

It is certified that error appears in the above-identified patent and that said Letters Patent is hereby corrected as shown below:

In the Claims

Column 36, Line 41 (Claim 9): Replace "audit database comprises for each audit file of a" with --audit database comprises, for each audit file of a--

Column 36, Line 55 (Claim 13): Replace "IThe method of claim 1," with --The method of claim 1,--

Column 36, Line 61-62 (Claim 14): Replace "hardware processor, cause the processor to perform steps comprising:" with --hardware processor, cause the processor to:--

Column 38, Line 12 (Claim 18): Replace "circuitry, cause the processing circuitry:" with --circuitry, cause the processing circuitry to:"--

Signed and Sealed this
Sixteenth Day of September, 2025

Coke Morgan Stewart
*Acting Director of the United States Patent and Trademark Office*